(12) United States Patent
Krusche et al.

(10) Patent No.: US 6,662,202 B1
(45) Date of Patent: Dec. 9, 2003

(54) DATA MANAGEMENT SYSTEM OF A REAL-TIME SYSTEM

(75) Inventors: Stefan Krusche, Dachau (DE); Dirk Lukas, Gräfelfing (DE); Stefan Lang, München (DE); Jürgen Lantermann, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 08/737,044

(22) PCT Filed: May 3, 1995

(86) PCT No.: PCT/DE95/00583

§ 371 (c)(1),
(2), (4) Date: Nov. 4, 1996

(87) PCT Pub. No.: WO95/30955

PCT Pub. Date: Nov. 16, 1995

(30) Foreign Application Priority Data

May 10, 1994 (DE) .......................................... 44 16 552

(51) Int. Cl.⁷ ............................................... G06F 12/00
(52) U.S. Cl. ..................................... 709/101; 707/203
(58) Field of Search ........................ 395/712; 707/203, 707/3, 200–204, 103 R; 709/101, 300, 310, 316; 717/11, 170

(56) References Cited

U.S. PATENT DOCUMENTS

| | | | | |
|---|---|---|---|---|
| 4,627,019 A | * | 12/1986 | Ng .................... | 364/900 |
| 4,809,170 A | * | 2/1989 | Leblang et al. .......... | 364/200 |
| 5,027,316 A | * | 6/1991 | Frantz et al. ............ | 363/900 |
| 5,179,703 A | * | 1/1993 | Evans .................... | 395/700 |
| 5,278,979 A | * | 1/1994 | Foster et al. ............ | 395/600 |
| 5,280,612 A | * | 1/1994 | Lorie et al. ............. | 395/600 |
| 5,287,496 A | * | 2/1994 | Chen et al. .............. | 395/600 |
| 5,410,703 A | * | 4/1995 | Nilsson et al. ........... | 395/700 |
| 5,440,730 A | * | 8/1995 | Elmasri et al. ........... | 395/600 |
| 5,682,533 A | * | 10/1997 | Siljestroemer ........... | 395/616 |
| 5,687,363 A | * | 11/1997 | Oulid-Aissa et al. ....... | 395/604 |

* cited by examiner

*Primary Examiner*—Sue Lao
(74) *Attorney, Agent, or Firm*—Schiff Hardin & Waite

(57) ABSTRACT

Data management systems of real-time systems are intended to provide user systems with rapid and consistent on-line management of various data generations. This is achieved by an access data structure which allows a generations management system (GMS) to carry out the management of various data generations on the basis of the same data objects already used on a previous occasion by a transaction management system (TMS) for carrying out transactions.

7 Claims, 29 Drawing Sheets

FIG 8

TG_LOGBOOK

TA_ID

| HEADER : Actual TA_ID | | | | | |
|---|---|---|---|---|---|
| PROCGRP_ID | STATUS | GEN_ID | TGS_LINK | NO_TGSE | TA_DATA_LENGTH |

FIG 9

SCOPE_TABLE

| HEADER: | GEN_ID_OLD |
| | GEN_ID_NEW |
| | TA_ID = 1001 |
| | TA_ID = 1004 |
| | TA_ID = 1003 |
| | TA_ID = 1002 |

GEN_ID data pool (final location)

DATA MANAGEMENT SYSTEM OF A REAL-TIME SYSTEM

BACKGROUND OF THE INVENTION

Data management systems of real-time systems are intended to offer their user systems rapid and reliable (consistent) on-line management of various data generations.

SUMMARY OF THE INVENTION

The invention is based on the object of specifying a data management system which meets the above-mentioned requirements.

In general terms the present invention is a data management system of a real-time system. A transaction management system controls transactions between users and the data management system, a transaction being a sequence of accesses to logically interdependent data. An access data structure is inserted in the course of a transaction by the transaction management system into the access path of a data object to be modified. The data structure has a separating filter with a first output to the old image of the data object and a second output to the new image of the data object. A generations management system manages the new data generation produced in the course of a transaction after the ending of the transaction on the basis of the access data structures (TGSE) inserted by the transaction.

The functional coupling of the transaction control with the generations management via a shared access, data structure to the data objects of the data management system has the effect that the management of various data generations is carried out on the basis of the same data objects as are also used by the transaction management system. This allows rapid and reliable on-line management.

One embodiment of the present invention has a management data structure, with which the transaction management system combines the access data structures inserted in the course of a transaction by linking them together to form a data generation with a specific generation identifier. The generation identifier subsequently is transferred to the generations management system for management of the data generation combined in this way. By this embodiment, the new data objects generated in the course of a transaction are combined to form a data generation and are consequently uniquely identifiable according to the sequence in which they are generated on the basis of a GEN_ID. This makes it possible for the generations management system for example to delete a no longer required data generation as a whole, i.e. by a single delete instruction.

In another embodiment the generations management system is a reading management system, which controls logically associated read accesses, so-called reading sequences. The reading management system uses the generation identifier transferred to the generations management system in order to carry out a consistent reading sequence access. This embodiment allows reading sequences to be carried out in parallel with a transaction.

In a further embodiment the access data structure has a barring field, with which a transaction can reserve exclusively for itself access to a data object behind it by storing a transaction identifier. By this embodiment, access by transactions parallel to a transaction to the same data object is prevented.

In yet another embodiment the access data structures are dynamically assigned to the data objects. The dynamic assignment allows the handling of data objects of various granularity. This means that a TGSE can be assigned both to a data object of smallest granularity (data element) and to a data object of coarser granularity (data group). The said dynamic assignability is achieved by the TGSEs being generated either dynamically as required, or taken from a common pool.

In a further embodiment the data layout of an access data structure is designed such that the first output of the separating filter of an access data structure can also point ot an older access data structure. By this embodiment, the TGSEs can be linked together by the transaction management system according to the sequence in which they were created to form a generation tree, which is subsequently managed by the generations management system. This embodiment presupposes the dynamic assignment of the TGSEs.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

In the drawing, the arrows between the system blocks represent a functional relationship (for example a procedure call, the head of an arrow pointing to the procedure called up);

FIG. 8 shows the structure of the logbook for managing transactions;

FIG. 9 shows the structure of the scope table;

DESCRIPTION OF THE PREFERRED EMBODIMENTS

Figure 1:
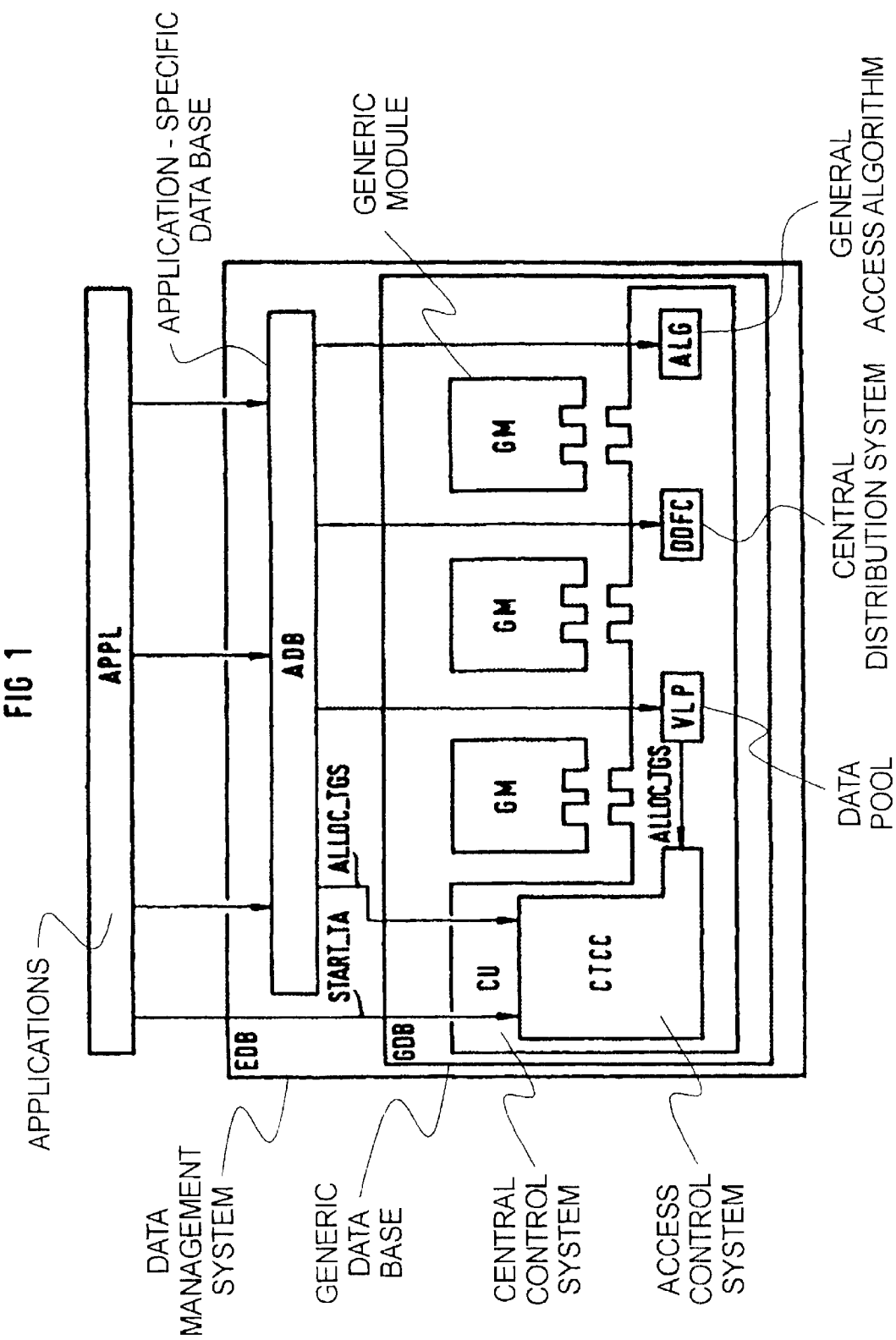
FIGS. 1 and 2 show the structure of a data management system EDB according to the invention, which can be accessed by various applications APPL.
Figure 2:
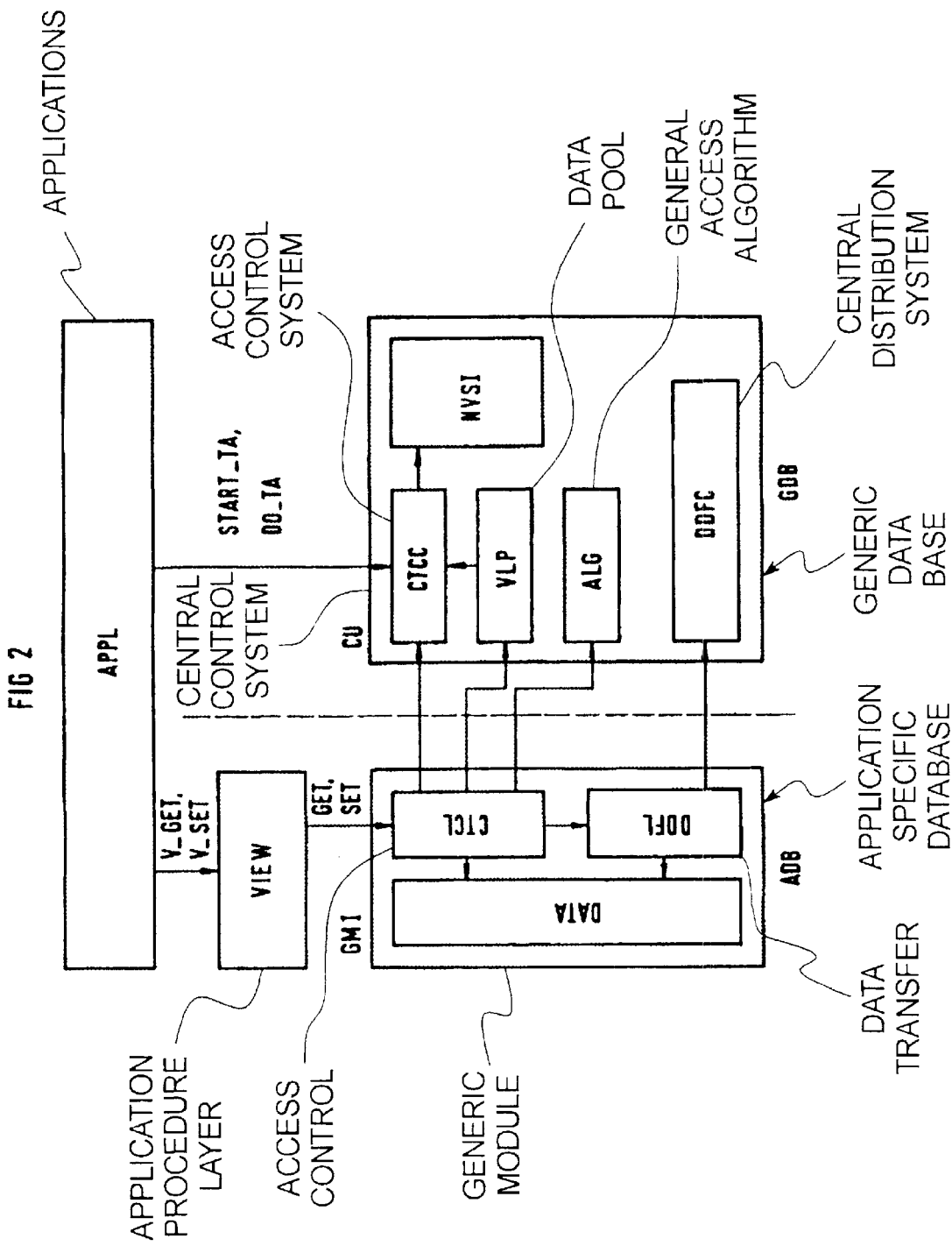

The data management system comprises two layers, namely an application-specific system layer, which is referred to in the following as application-specific database ADB, and an application-independent system layer, which is referred to in the following as generic database GDB.

The generic database GDB comprises central and local functions, the central functions being realized in a central control system CU and the local functions being realized in generic modules GM.

The central control system CU contains a central access control system CTCC, which centrally controls accesses (individual accesses or access sequences), general access algorithms ALG, a saving system NVSI, which realizes the interface with a backing store for saving the user data, a data pool VLP for managing data of variable length and a central distribution system DDFC, which serves for the distribution of updated user data to the various processors of the real-time system.

A generic module GM represents a definition module for the description of a data container, which contains data structures for storing the user data and also the access structures required for this purpose, i.e. addressing methods and elementary access procedures. In addition, the generic modules contain additional structures for supporting the central functional system, i.e. structures for supporting coordination and the ensuring of consistency (local access control system CTCL), and also structures for supporting the distribution of the user data to various platforms (local data distribution system DDFL). The description of said structures in the generic module in this case takes place in a way independent of the user, i.e. in a way independent of the data layout of the data structures.

Different types of generic modules are produced by combining modules (for example local access control system CTCL, local distribution system DDFL and additional data definitions necessary for this, various addressing methods). The variants are determined by the requirements arising from the data modeling of the corresponding application.

Each generic module contains a set of elementary access procedures concerning the control of an individual access. This set comprises a procedure GET for reading user data, a procedure SET for modifying user data and also procedures CREATE and DELETE for creating and deleting data elements of the user. Access to the data of a user is possible only by means of these special access procedures (data encapsulation). Data with a corresponding persistence requirement are saved in the core-image format on a backing store. This ensures that the current data are available as quickly as possible after a restart of the switching computer with the associated loading operation.

The application-specific database ADB comprises views and module instances, the module instances being produced from the generic modules by instantiation.

Said instantiation has the effect of initializing the data containers (generic modules) with specific data declarations, whereby the data structures and the access algorithms to these data structures are brought into relation with one another. The views form the interface with the current application APPL. They consequently represent the logical picture of the conceptual data model of this application.

The access control system controls access by users to the data management system EDB and thereby ensures that an updating operation takes the data in the data management system from a consistent initial state into a consistent end state. To ensure this consistency, the access control system handles access sequences (transactions or reading sequences) in an integral (atomic) way, i.e. a transaction is, for example, either carried out in its entirety or rejected in its entirety.

In addition, the access control system coordinates the simultaneous access of access sequences parallel to one another.

The access control system comprises the CTCC, which carries out for the user those control jobs (for example START_TA, DO_TA, ABORT_TA) which concern the controlling of an access sequence in its entirety.

The central data pool VLP manages semi-permanent and transient data of variable length. It comprises both the data and a set of primitives, in order to store and manipulate the data looked after by it.

All the data managed by the central data pool are encapsulated by the data pool. All accesses to these data can thus take place only via said primitives. Said module instances can have a block of any desired length reserved from the data pool, each reserved data block being identified by a logical key assigned during its reservation.

The generic access algorithms ALG comprise functions which are common to all the generic modules, namely on the one hand algorithms for the logical organization of the data maintenance (for example linked list, binary tree), on the other hand mechanisms for physically storing the data, i.e. data-structure-independent paths through database-internal management or access structures. The generic access algorithms are called up exclusively from the generic modules.

The DDFC controls the transfer of user data from one platform (processor) to other platforms (processors) and thereby ensures data consistency between various platforms (processors). The DDFC is dynamically called up by a DDFL of a user module.

As already mentioned, a generic module serves as a data container, which describes data structures and also specific access algorithms for these data structures in an application-independent way, i.e. in a manner independent of the data layout. A generic module comprises a set of access procedures to the data management system, which it makes available to the respective application in order in this way to realize a reading or writing access to the data contained in the generic database GDB.

On account of the internal architecture of a generic module, which distinguishes between data-structure-specific parts and general parts of the data access and of the data handling, general functions can be declared as generic algorithms ALG, which can be used by each generic module, since they are contained in the central module CM of the generic database. In addition, the generic modules use other general functions, which are made available by the central access control system CTCC and the data pool VLP.

A main purpose of the introduction of generic modules is the reusability and resubstitutability of software. The generic modules form a library, from which application-specific object classes can be produced by instantiation, i.e. by the substituting of general data layout information (space savers, in CHILL for example ANY_ASSIGN) by specific layout information. The application can select suitable generic modules, instantiate them and combine the instantiated modules to form one or more views.

The insertion of the application procedure layer VIEW between the application and the user module achieves the effect that the respective application is independent of the logical data structures. With the aid of an application procedure, one or more user modules are accessed, one user module in each case managing one object class. An application procedure contains as parameters the desired attributes of the respective data object, these parameters being return parameters, which are returned to the application after execution of the user procedure. The application procedure consequently has the effect of providing the application with its own way of viewing the stored application data. Changes to the logical data structures consequently have no effects on the applications.

An application or a user uses for the management of its or his user data exclusively the application procedures VIEW. For the consistent amendment of dependent data, a corresponding sequence of user procedure calls is characterized by commands to the central access control system as a transaction. The carrying out of the transaction and also the saving of the data on the backing store and the distribution of the data are performed in an independent way by the data management system and are consequently completely invisible for the user.

Figure 3:
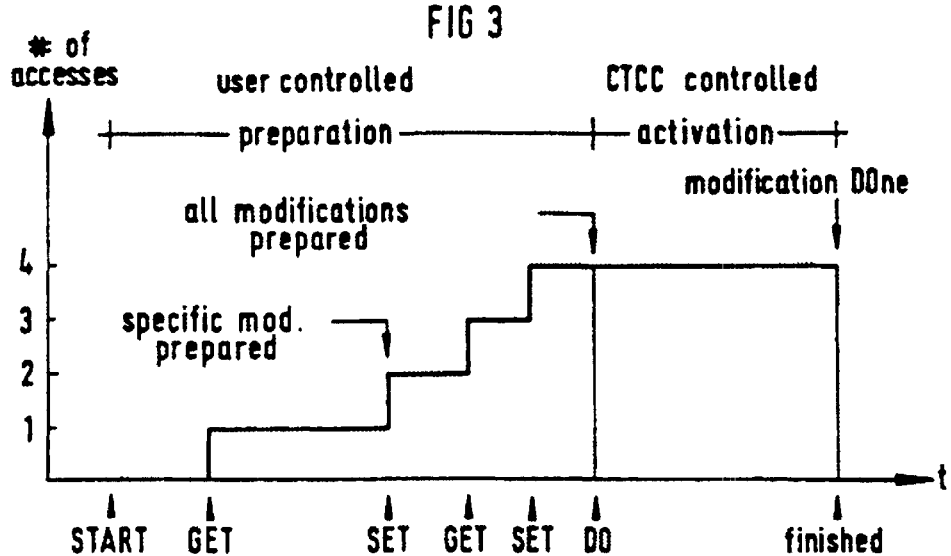
FIG. 3 shows the preparation phase and the activation phase of a transaction.

FIG. 3 shows the preparation phase and the activation phase of a transaction.

In the preparation phase, controlled by the user, the transaction is built up step by step, in that the access procedures (SET, GET, etc.) for individual accesses are called up one after the other by the user. In principle, any number of individual accesses may be initiated within a transaction by calling up the corresponding access procedures.

The preparation phase is started by the procedure START_TA and ended by the procedure DO_TA. The procedure START_TA assigns the transaction a transaction identifier TA_ID and passes it on to the user. The user then uses this TA_ID as an input parameter when calling up the access procedures for individual accesses.

In the preparation phase, the calls of the access procedures are recorded and any amendments of the data affected by the access are prepared. In the preparation phase, the user has the possibility of rejecting the transaction by calling up the procedure ABORT_TA.

Calling up the procedure DO_TA at the same time has the effect of starting the activation phase, which is controlled exclusively by the central access control system and therefore runs independently of user calls. In the activation phase, consequently no further calls for individual accesses can be taken into consideration.

In the preparation phase, the coordination of a transaction is carried out, i.e. all the collision cases with other parallel transactions are identified and coordinated. The coordination in this case takes place by those transactions which were started earlier being allowed to continue, whereas other parallel transactions are rejected by a corresponding negative acknowledgement being returned to the user. Since all collision cases are consequently resolved in the preparation phase, transactions can be carried out independently of one another in the activation phase.

Figure 4:
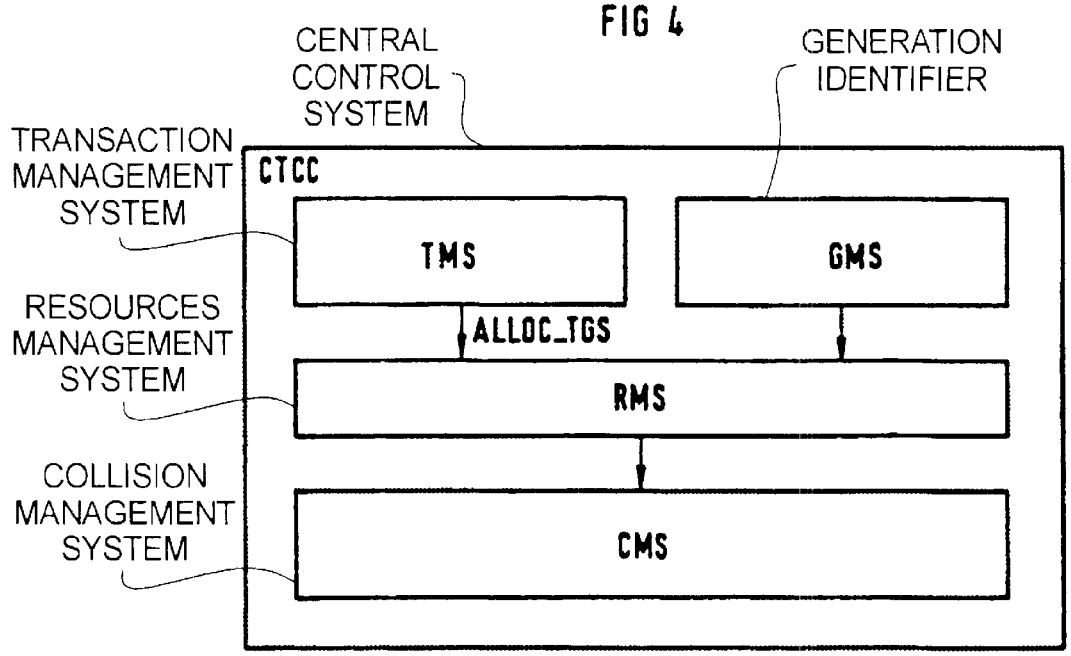
FIG. 4 shows the structure of the central access control system.

FIG. 4 shows the structure of the central access control system CTCC. The central access control system CTCC comprises a transaction management system TMS, a generations management system TMS, a resources management system RMS and a collision management system CMS.

The transaction management system TMS controls the transaction-oriented access to the data objects OCI of the data management system.

The generations management system GMS manages the data generations produced in the course of transactions on the basis of a generation identifier GEN_ID allocated by the transaction management system to a transaction during the activation phase. This management comprises the updating of a newly produced data generation, i.e. the transferring of the new data generation to its final storage locations in the main memory and/or on the disk. In addition, said management comprises the controlling of reading sequences (sequences of logically associated read accesses to the data objects of the data management system).

This type of management makes it possible for a group of data objects of one and the same generation to be read in the course of a reading sequence, while a transaction takes place in parallel with this.

The resources management system RMS manages the access data structures which are used during access of the transaction management system and/or the generations management system.

The collision management system CMS coordinates writing accesses to one and the same data object which are triggered by parallel transactions and prevents the oldest data generation from being deleted while at the same time a reading sequence wants to have reading access to data objects of this data generation.

The RMS comprimises as the largest data structure a separating filter pool TGS_POOL, which is used both by the transaction management system TMS and by the generations management system. The separating filter pool serves the purpose of maintaining (buffer-storing) new data (transaction-oriented inputs) received by the transaction management system TMS in the course of a transaction, until they have been stored in their final storage locations in the memory and on the disk by the generations management system.

The RMS further comprises a logbook TG_LOG, which makes possible suitable management of the transactions, a scope table SCOPE_TAB, which serves for managing the various data generations, and as the smallest administrable data structure the already mentioned separating filter structure TGSE.

Figure 5:
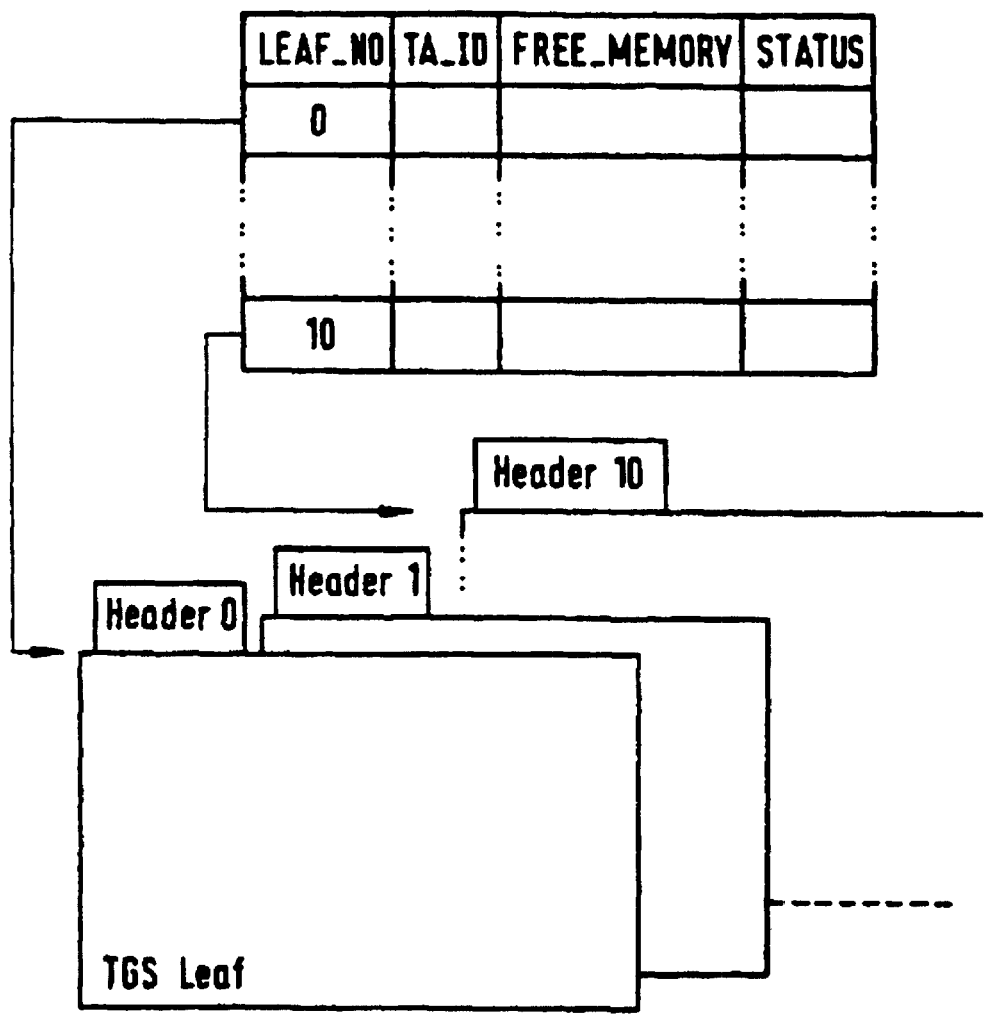
FIG. 5 shows the architecture of the separating filter pool.

FIG. 5 shows the architecture of the separating filter pool TGS_POOL.

The architecture of the separating filter pool comprises 10 transaction leaves TL with corresponding headers 0 to 10. It follows from this that the transaction management system supports 10 transactions in a parallel way, since each transaction leaf TL is reserved exclusively for a specific transaction, in that an assigned transaction identifier TA_ID is entered into the corresponding data field of the associated header. An additional eleventh transaction leaf is provided in order to allow an active transaction to continue in its execution even when its associated transaction leaf is running short due to a lack of adequate available memory (indicated by a data field FREE_MEMORY with the header).

In order that a transaction leaf can be made available by the resources management system, three conditions must be met. As the first condition, the free storage location of the heap, which is indicated in a data field FREE_MEMORY of the header, must lie above a certain threshold. As the second condition, a data field TA_ID of the header must not have any entry. As the third condition, a data field STATE of the header, which indicates the state of a transaction, must indicate the state "free".

The data content of the data field STATE is a transient parameter within the semi-permanent transaction leaf which is necessary to continue to reserve a transaction leaf during an updating phase, although the semi-permanent parameters FREE_MEMORY and TA_ID are already indicating the reusability of the transaction leaf for other transactions.

Figure 6:
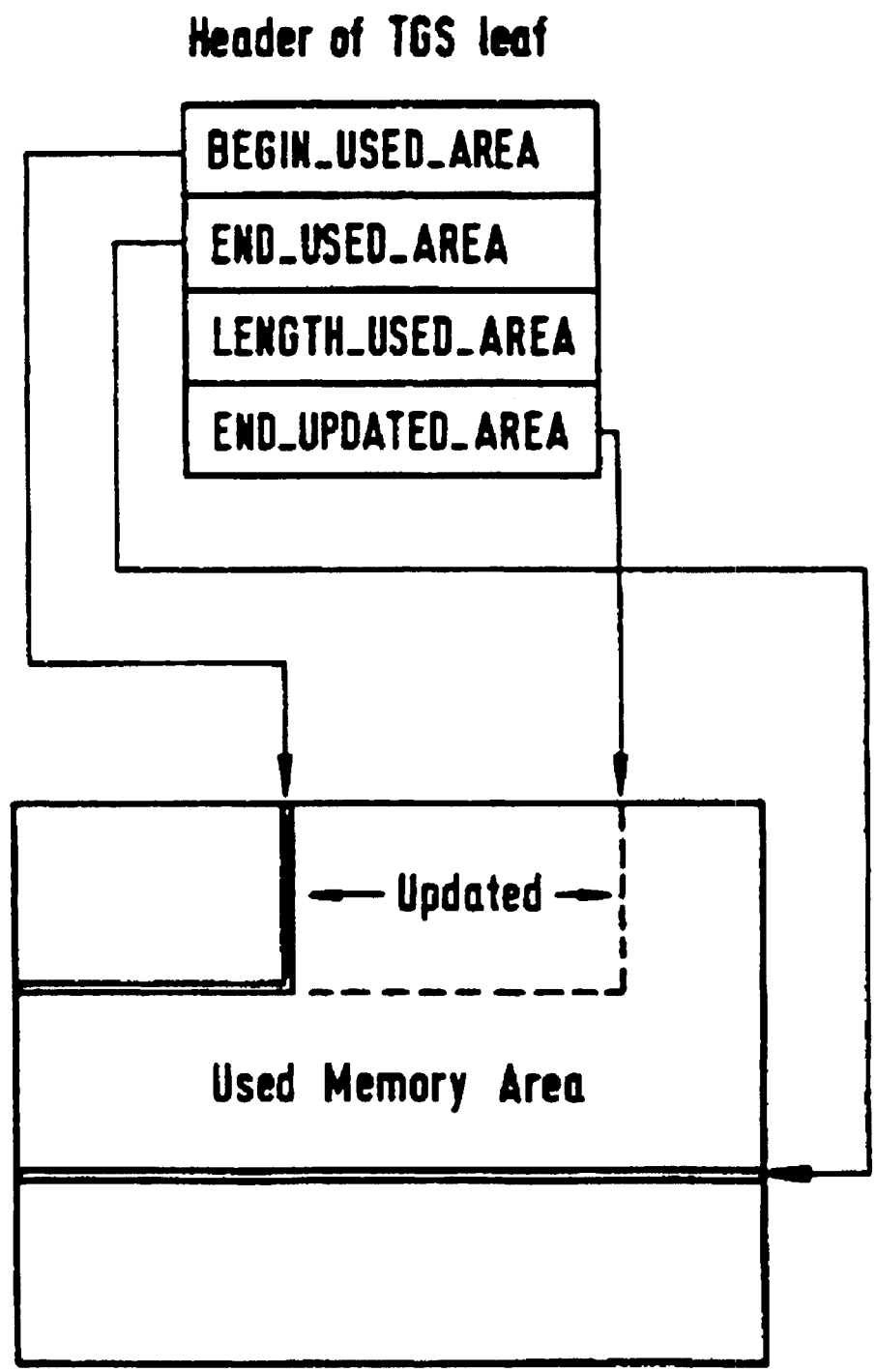
FIG. 6 shows the architecture of a transaction leaf.

FIG. 6 shows the architecture of a transaction leaf, in particular the data fields contained in the header of the transaction leaf TGL.

A data field BEGIN_USED_AREA shows the beginning of the memory area which is being used by the transaction leaf TGL for storing the input data of a transaction. A data field END_USED_AREA indicates the end of said memory area. The data field END_USED_AREA at the same time indicates the beginning of the memory area which can be used by a further TGL.

A data field LENGTH_USED_AREA contains a redundant parameter for monitoring purposes, which indicates the difference of the memory between the content of the data field BEGIN_USED_AREA and the data field END_USED_AREA.

Finally, a data field END_UPDATED_AREA indicates the momentary end of the memory area already transferred onto the disk by the transaction.

Figure 7:
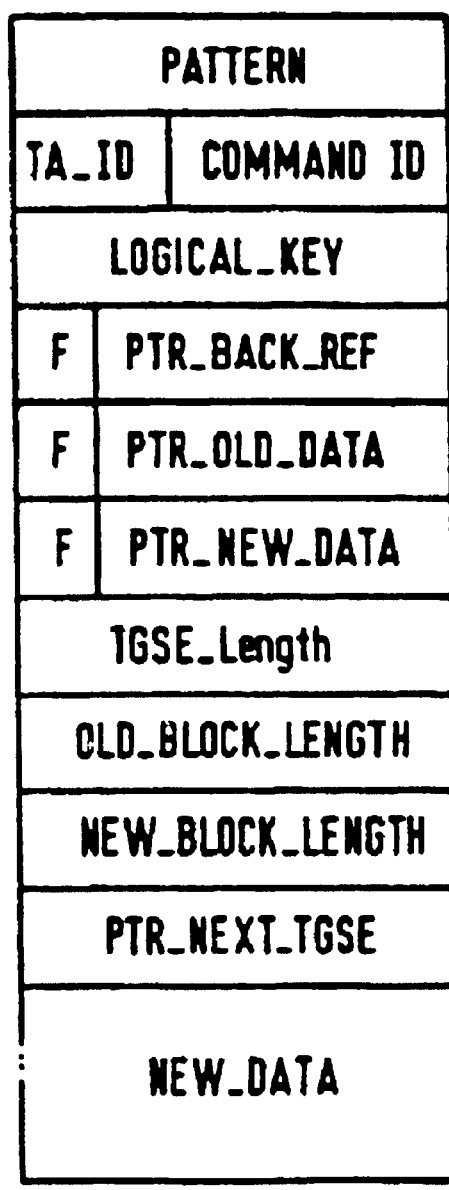
FIG. 7 shows the composition of a separating filter structure.

FIG. 7 shows the composition of a separating filter structure TGSE, which represents the smallest data structure managed within the separating filter pool, and which is assigned to a transaction by a primitive of the transaction management system or of the generations management system and is set into a transaction leaf TGL as an overlay structure.

A data field PATTERN represents a parameter for monitoring purposes which indicates that the separating filter structure is linked with a complete memory block which has been assigned to the transaction by the data pool VLP.

A transaction identifier TA_ID, which denotes that transaction which has requested (assigned) the separating filter structure and which reserves exclusively for the associated transaction the data structure appended to the separating filter structure, for example a data object.

A command identifier COM_ID and a logical key LOG_KEY represent protocol information per data object serving for communication with the generic modules.

A backward reference PTR_BACK_REF, which represents a pointer to an entry in a translator device for the logical key, or in the case of a generation tree a pointer to the previous separating filter structure. A flag F distinguishes between the two said cases.

A pointer PTR_OLD_DATA, which represents a pointer to the old image of a data object, or in the case of a generation tree a pointer to the next separating filter structure. The two said cases are in turn distinguished by a flag F.

A pointer PTR_NEW_DATA, which represents a pointer to a new image of a data object, a flag F indicating whether the data of the new image are to be downloaded onto other leaf forms.

A data field TGSE_L, which represents the physical length of the data stored in a data field NEW_DATA.

A data field OLD_BLK_L, which represents the physical length of the old memory block assigned by the data pool VLP.

A data field NEW_BLK_L, which represents the physical length of the new memory block assigned by the data pool VLP.

A pointer PTR_NEXT_TGSE, which represents a pointer, assigned in the same transaction, to the next separating filter structure.

A data field NEW_DATA, which represents a data container for receiving the new data.

The description of the separating filter structure TGSE with reference to FIG. 7 brings to an end the description of the semi-permanent separating filter pool TGS_POOL and there now follows the description of a further data structure of the RMS, the so-called logbook TG_LOG.

FIG. 8 shows the structure of the logbook TG_LOG for managing transactions. The semi-permanent logbook represents a table in which a line is respectively reserved for each existing transaction identifier TA_ID of the separating filter pool.

The semi-permanent logbook represents a table for managing transactions which contain in their header a current transaction identifier TA_ID_ACT. The value of this current transaction identifier is assigned to each newly started transaction and is then incremented. The current transaction identifier in the header is implemented as a cyclical counter.

The fields of an exemplary line of the logbook are explained in more detail below.

A data field PROCGRP_ID, which contains information on the process group which the transaction has started.

A status field STATUS contains information on the status (phase) of a transaction. A transaction is essentially divided into three phases, namely a preparation phase and an activation phase, which are both under the control of the transaction management system, and a generation phase, which is under the control of the generations management system, and in which the new data are transported to their final storage locations in the memory and on the disk. The individual steps of said different phases are recorded as status information in the status field. This recording allows the consistency management system to respond in a suitable way to events which trigger a restarting of the real-time system.

FIG. 9 shows the structure of the scope table SCOPE_TAB, the purpose of which is explained in more detail below.

The beginning of a transaction is marked in a unique way by the allocation of a transaction identifier TA_ID. The producing of a new data generation within the activation phase of a transaction additionally requires the allocation of a generation identifier, which can likewise be identified in a unique way. Since all the actions executed in the generation phase of the transaction are carried out on the basis of the generation identifier, a semi-permanent data structure, namely said scope table SCOPE_TAB, must be available in order to be able to link the generation identifier with the transaction identifier and thereby be able to access the data newly introduced in a transaction.

A further purpose of the scope table is to record the overall scope of data generations which is managed by the generations management system. The transaction management system uses the scope table to assign a generation identifier to a transaction. For this reason, the scope table also contains a pool of generation identifiers.

The overall scope of generations which are recorded in the scope table is described by a parameter GEN_ID_OLD, which points to the end of the scope table, and a parameter GEN_ID_NEW, which contains a pointer to the beginning of the scope table. The parameter GEN_ID_NEW further contains a pointer to the pool of the generation identifiers, which is implemented as a cyclical counter.

The resource primitives contained in the RMS, which form a shell around the access data structures of the access control system CTCC and make these data structures transparent for all the other functional blocks of the access control system, are explained in more detail below. The use of these procedures is explained in more detail by flow charts in the figures which follow.

A procedure APPOINT_TAID evaluates the transaction identifier pool, assigns the current transaction identifier to the transaction requested and subsequently increases the value of the current transaction identifier.

A procedure ALLOC_TGL evaluates the semi-permanent header of the separating filter pool TGS_P, assigns a transaction leaf to the transaction or detects a lack of resources and thereupon initiates a transaction post-processing with high priority.

A procedure ENTER_TG_LOGBOOK transfers transaction information, for example information on the status of a transaction, into the logbook TG_LOG.

A procedure VERIFY_TAID verifies the transaction identifier TA_ID, which has been transferred by the user of the procedure DO_TA, which will be explained in more detail later, to the control system as a parameter in order to establish whether this transaction identifier is still recorded in the logbook.

A procedure DETMINE_TA_STATE determines the state of a transaction on the basis of the corresponding entry in the logbook.

A procedure APPOINT_GENID evaluates the generation identifier pool, assigns a current generation identifier and increments the momentary value of the current generation identifier.

A procedure ALLOC_TGSE represents a service procedure of the CTCC for the ADB. It allows a module instance of the application-specific database ADB, to assign to a transaction a semi-permanent separating filter structure TGSE for transaction-controlled inputs. The procedure ALLOC_TGSE comprises the following activities:

checking of the set of input parameters transferred from the module instance checking of available access data structures, and also calling up of a highly prioritized transaction post-processing if adequate storage capacity is not available copying of the new data into the assigned separating filter structure and insertion of the separating filter structure into the associated separating filter structure chain calling up of a procedure TA_CONTRL, to be explained later, of the collision management system and, in the case of no conflict, insertion of said separating filter structure into the data access part of the data object concerned.

A procedure CONFIRM_TADATA progresses through the separating filter structure chain and informs the data pool VLP in the case of a connected memory block of the data pool with the aid of the procedure CONFIRM_SEIZE.

A procedure DETMINE_TGSLNK evaluates the logbook TG_LOG and determines from it the separating filter pointer TGS_LINK.

A procedure DETMINE_TGSEINFO evaluates a separating filter structure TGSE and determines from it certain information, for example the transaction identifier TA_ID, or the type of linking of the separating filter structure from the data field PATTERN.

A procedure DETMINE_OLDTAID evaluates the logbook and determines from it the smallest transaction identifier TA_ID recorded therein.

A procedure ENTER_TGSHEADER transfers status information of a transaction, for example the information disk errors, into the corresponding status field of the header of the separating filter pool TGS_P.

A procedure TA_ROLLBCKMEM allows a reversal (roll backward) of transaction-controlled inputs. This procedure carries out the following actions:

it progresses through the separating filter structure chain of a transaction in the case of memory blocks being incorporated in the separating filter structure chain, it makes the data pool VLP release these memory blocks, it informs the Platform New functional complex of the module instance requesting the transaction if the command identifier corresponded to the create command, it releases the corresponding separating filter structure from the data access path, it resets the entries in the header of the transaction leaf TGL and of the separating filter pool TGS_P.

The procedure TA_ROLLBCKMEM is also used in the case of a disk error.

A procedure TA_ROLLFORWARD makes it possible to continue (roll forward) transaction-controlled inputs in the case of recovery events and contains for this purpose parts of the procedure DO_TA, explained later. The entry point into this contained procedure depends on the transaction status existing when the recovery event occurred.

More complex primitives of the resources management system RMS are explained below with reference to FIGS. 10 to 12.

Figure 10A:
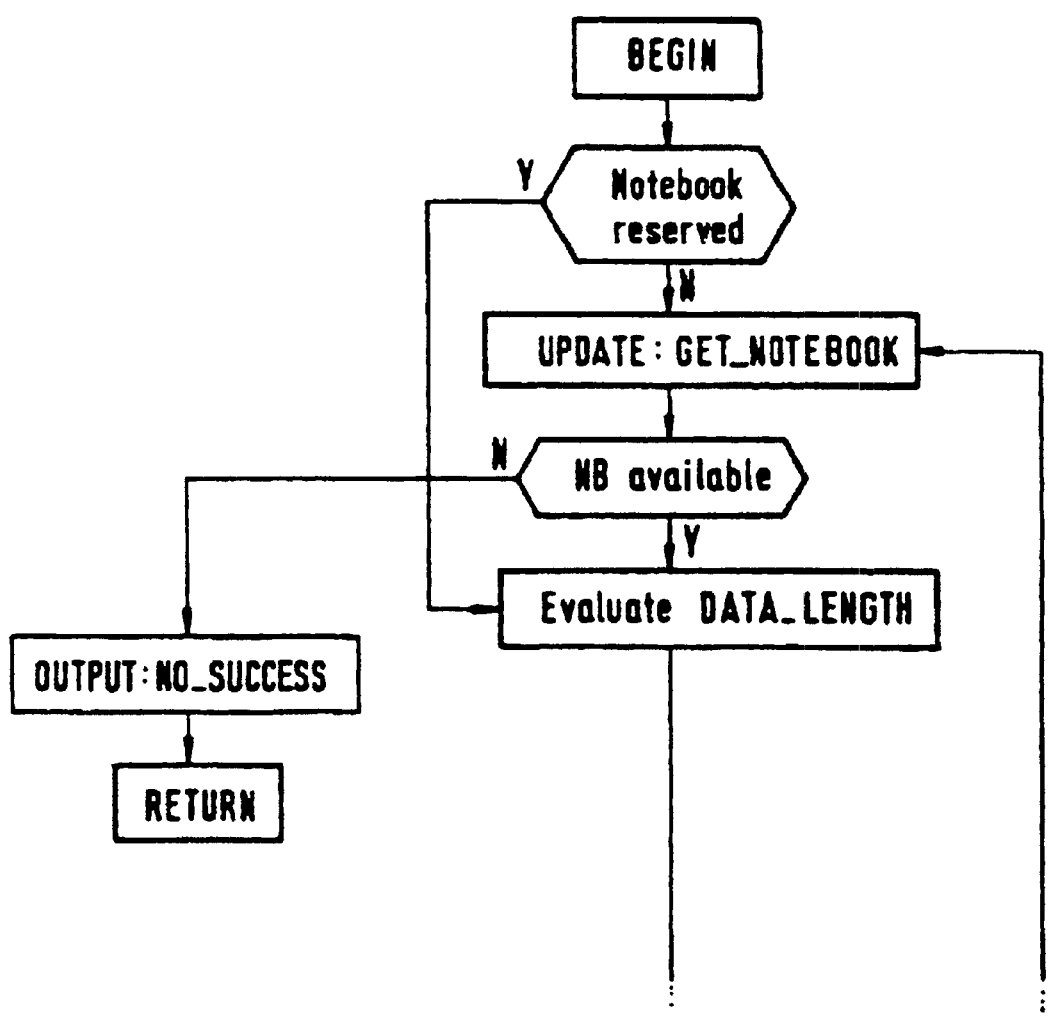
FIG. 10 shows a flowchart of the procedure for transaction data transfer.
Figure 10B:
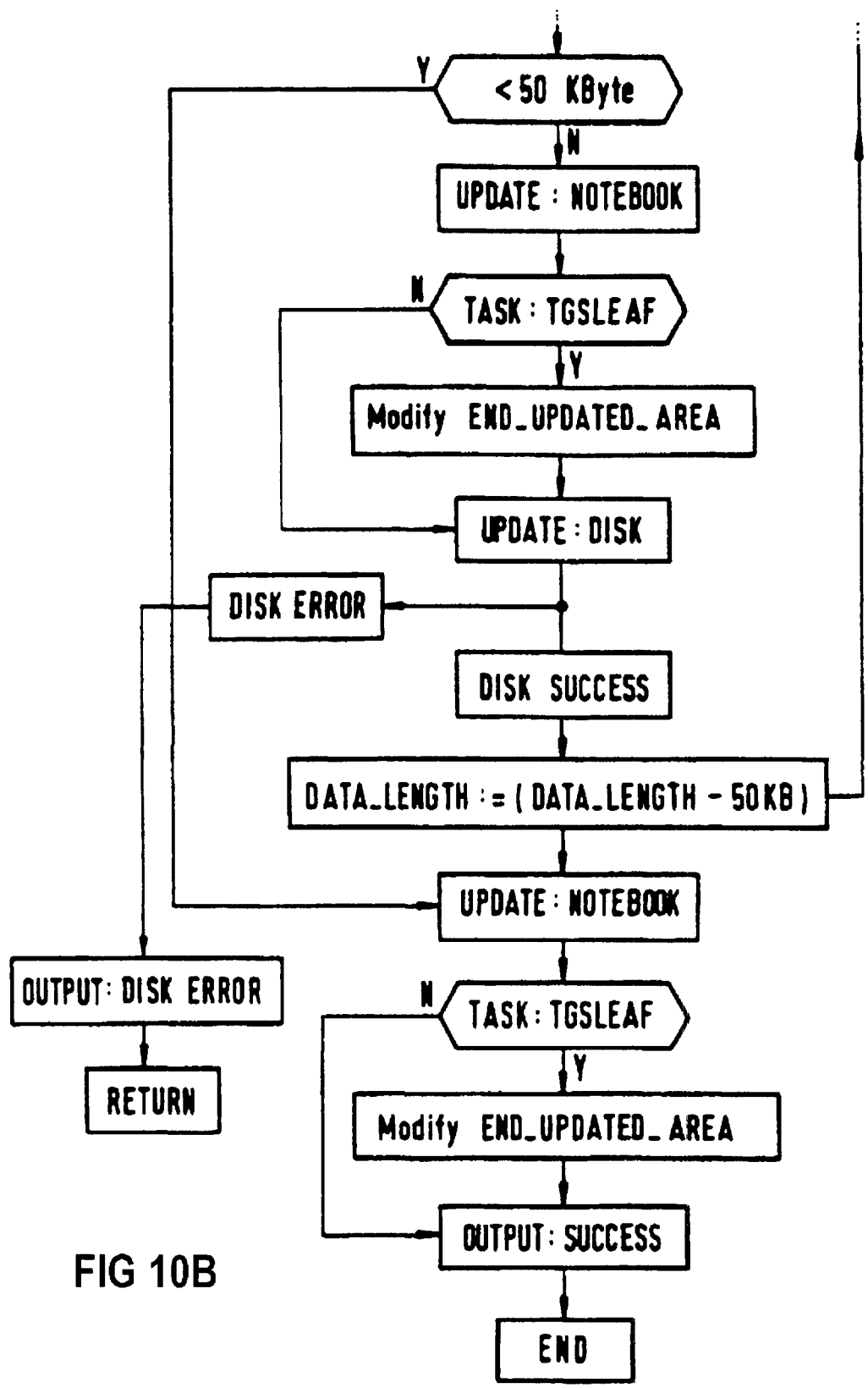

FIG. 10 shows a flow chart of the procedure DO_TADATA.

The procedure DO_TADATA causes transaction data transferred to the access control system to be passed on to the updating instance UPDATE, to be precise both for storing in the notebook NOTEBOOK and on the disk DISK. An input parameter TASK with the two possible values "TGSLEAF" or "VLP" determines in this case whether the procedure works with the transaction data established by the entry in the header of the transaction leaf or with those transaction data stored in a corresponding memory block in the data pool VLP. Possible output parameters OUTPUT of said procedure are "disk error", "NO_SUCCESS" and "SUCCESS".

Figure 11A:
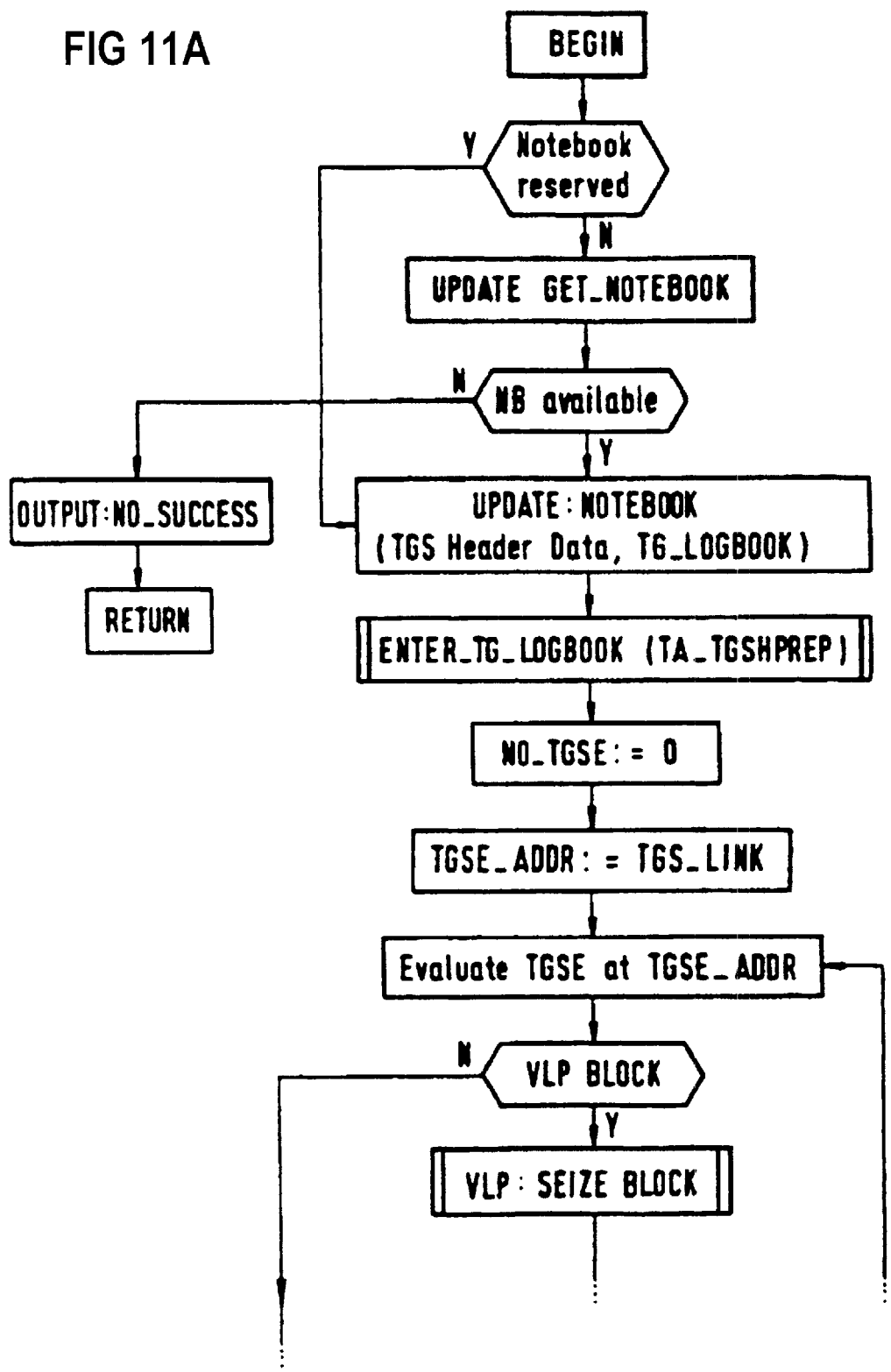
FIG. 11 shows a flowchart of the procedure for transferring the entries in the header of the separating filter pool.
Figure 11B:
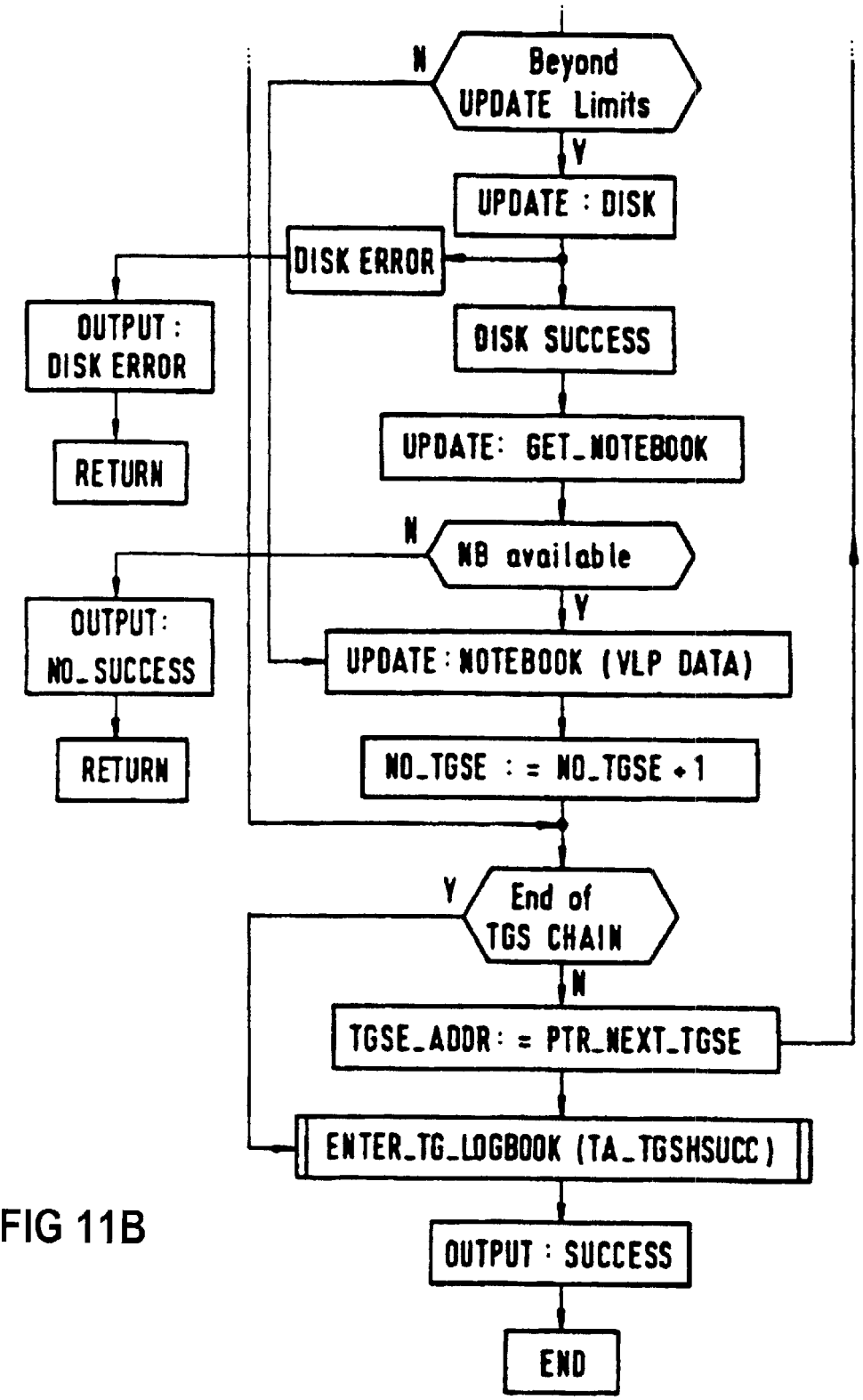

FIG. 11 represents the flow chart of a procedure DO_HEADER. This procedure transfers the entries in the header of the separating filter pool, of the transaction leaf and of the logbook of a transaction to the updating instance with the instruction to store in the notebook. Then, the procedure runs through the separating filter chain and transfers all the headers of the memory blocks of the data pool containing linking information likewise to the updating instance for storing in the notebook. For reasons of consistency, this procedure must likewise ensure that header information concerning data with respect to access data structures is entered into the same notebook. If necessary, this procedure must also call up the updating instance with the instruction for storing on the disk DISK. This procedure does not contain any input parameters, while its output parameters are identical to the output parameters of the procedure DO_TADATA. In addition, the procedure changes the status entry of the transaction in the logbook twice, to be precise the first time the status information TA_CLOSED is changed into the status information TA_TGSHPREP and the second time the status information TA_TGSHPREP is changed into the status information TA_TGHSUCC, if in the course of the procedure the updating information with the instruction to store on disk was called up.

Figure 12A:
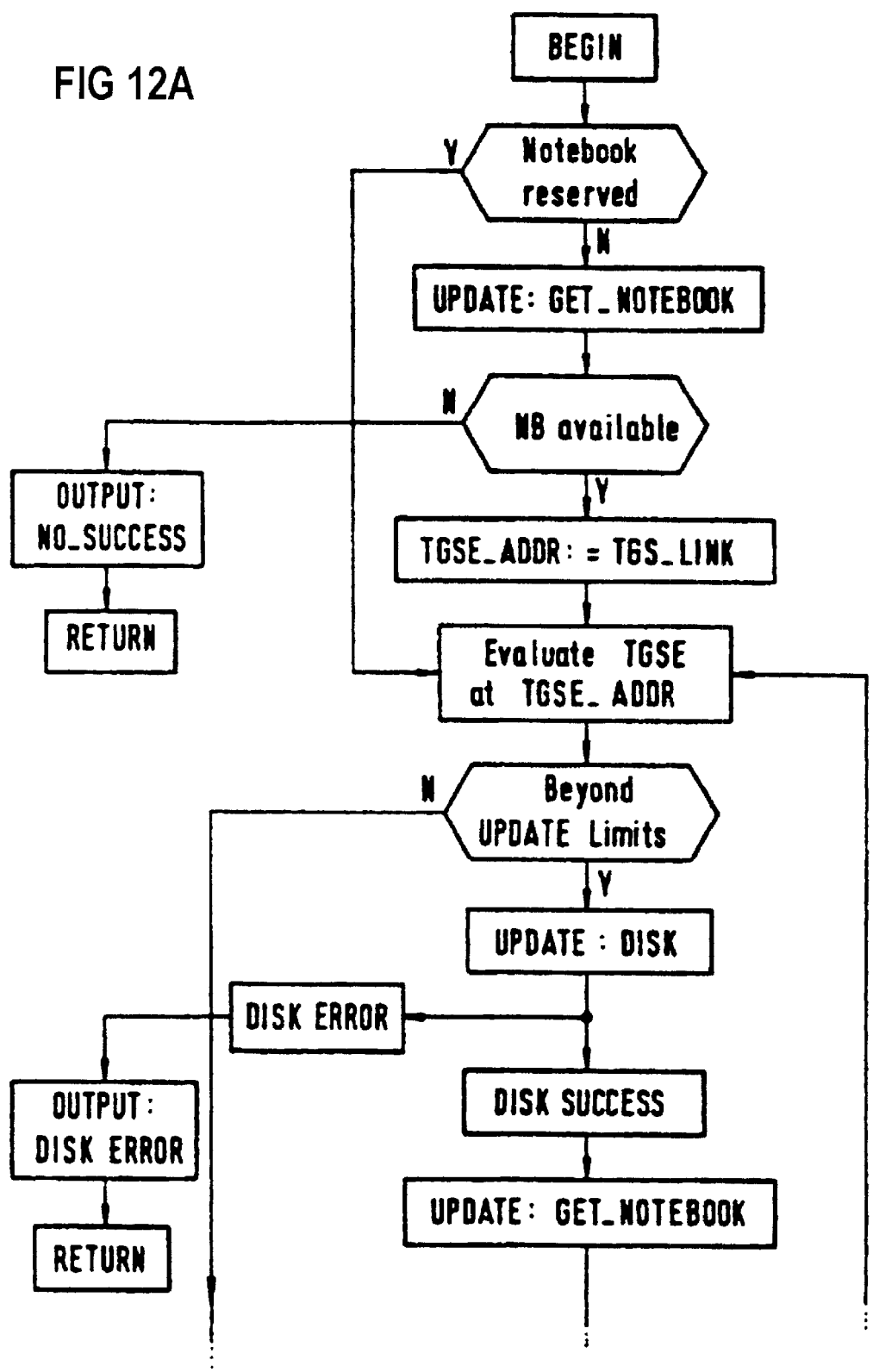
FIG. 12 shows the flowchart of the procedure that runs through the separating filter structure chain and that transfers linking information.
Figure 12B:
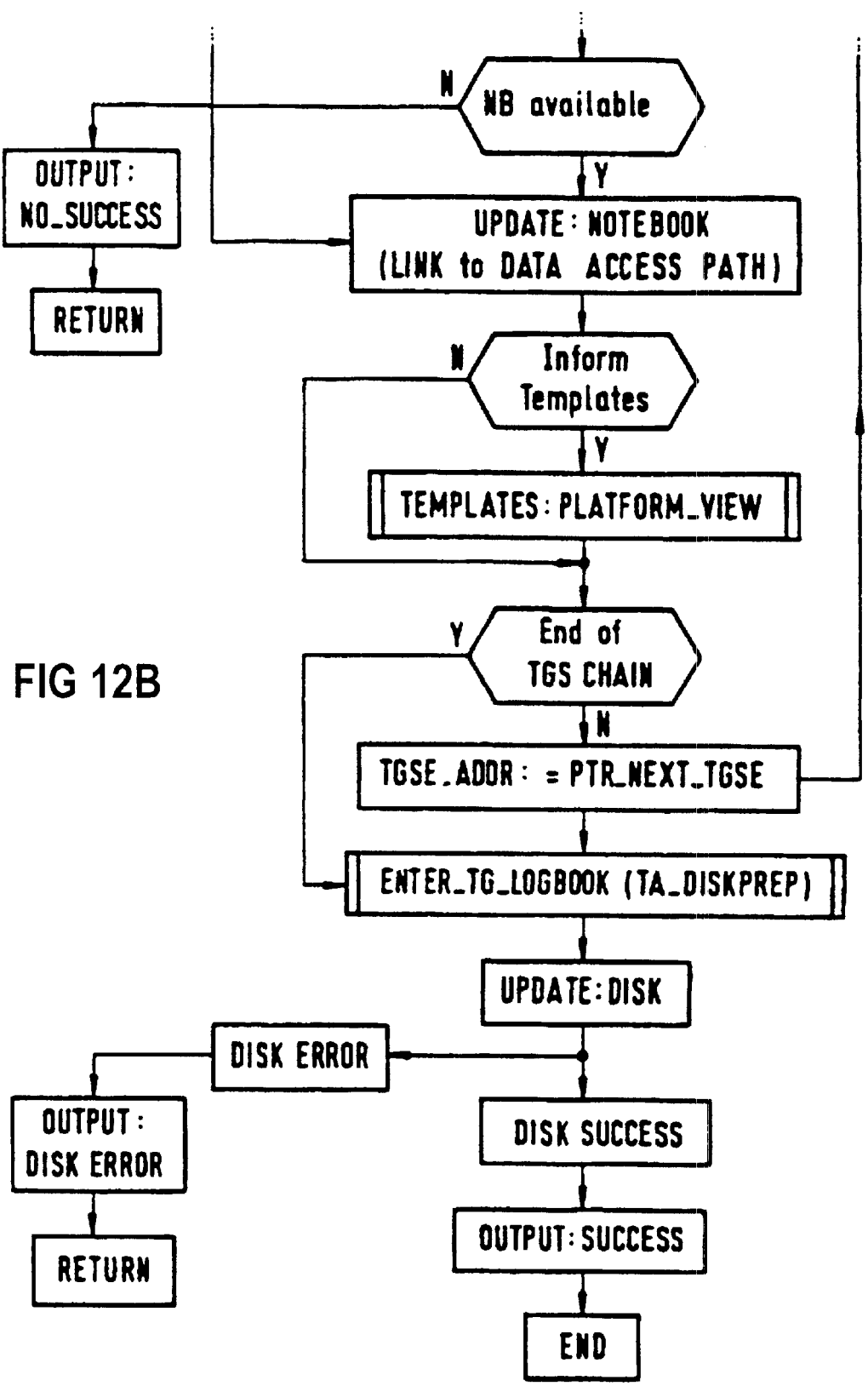

FIG. 12 shows the flow chart of a procedure DO_TGSE_ENTRY. This procedure runs through the separating filter structure chain and transfers linking information, which links a separating filter structure into the data access path, to the updating instance with the instruction for storing in the notebook. If necessary, it likewise initiates storing on the disk with the call UPDATE: DISK. The procedure has no input parameter and, as output parameters, has the same parameters as the previous procedure. In addition, the procedure changes possible status information TA_TGSHPREP or TA_TGSHSUCC into the status information TA_DISKPREP.

The interface procedures of the access control system with respect to the module instances have now been explained. The interface procedures of the access control system with respect to the user are explained in more detail below with reference to FIGS. 13 to 15.

Figure 13:
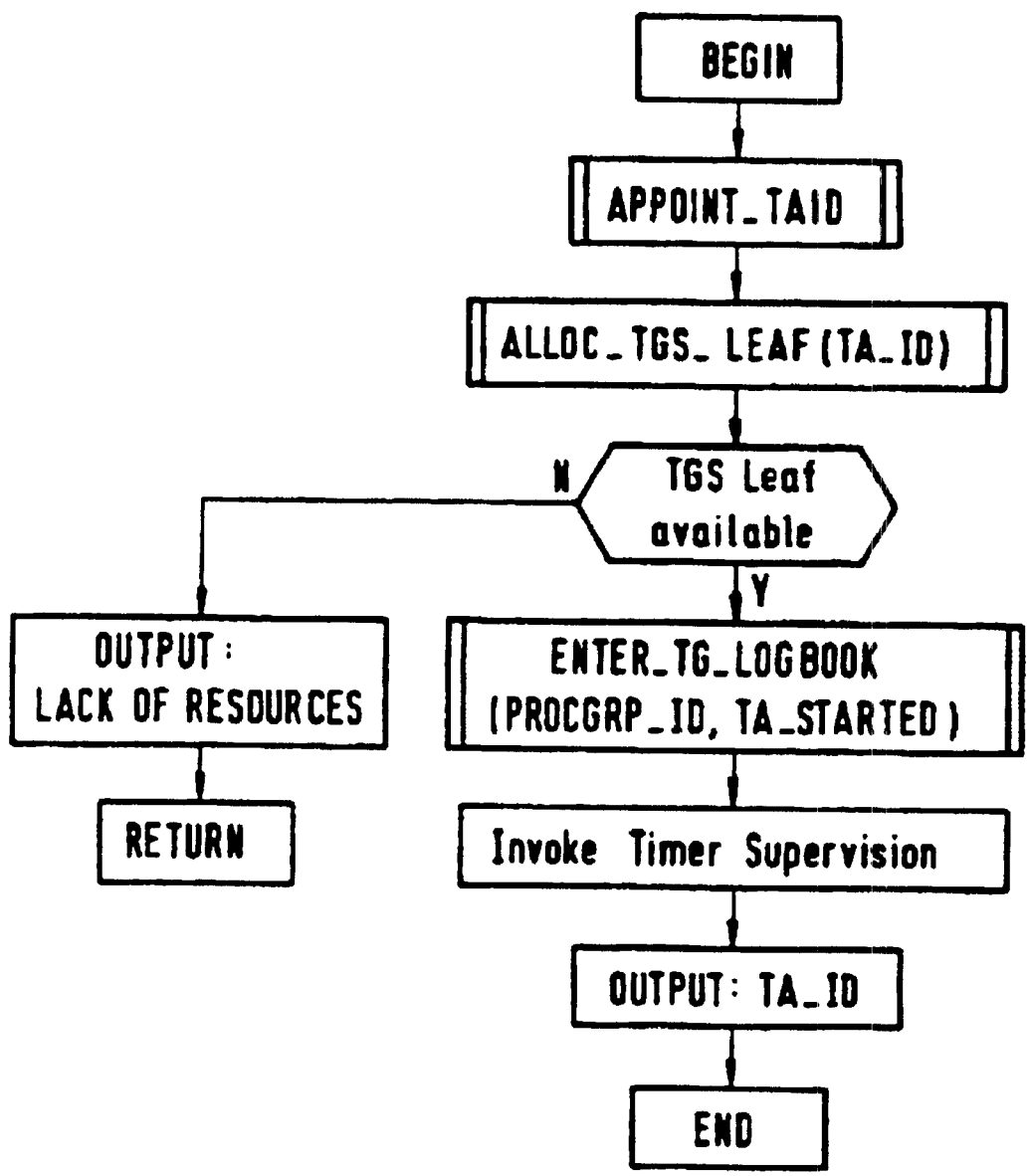
FIG. 13 shows the flowchart of a procedure that opens a transaction transferring the process group identifier to the access control system as the input parameter.

FIG. 13 shows the flow chart of a procedure START_TA. This procedure opens a transaction, transferring the process group identifier to the access control system as the input parameter. And as output parameters, it receives the parameters TA_ID and/or "LACK OF RESOURCES" indicated in FIG. 13. The status information is received in the course of this procedure from "NO_TRANS".

Figure 14:
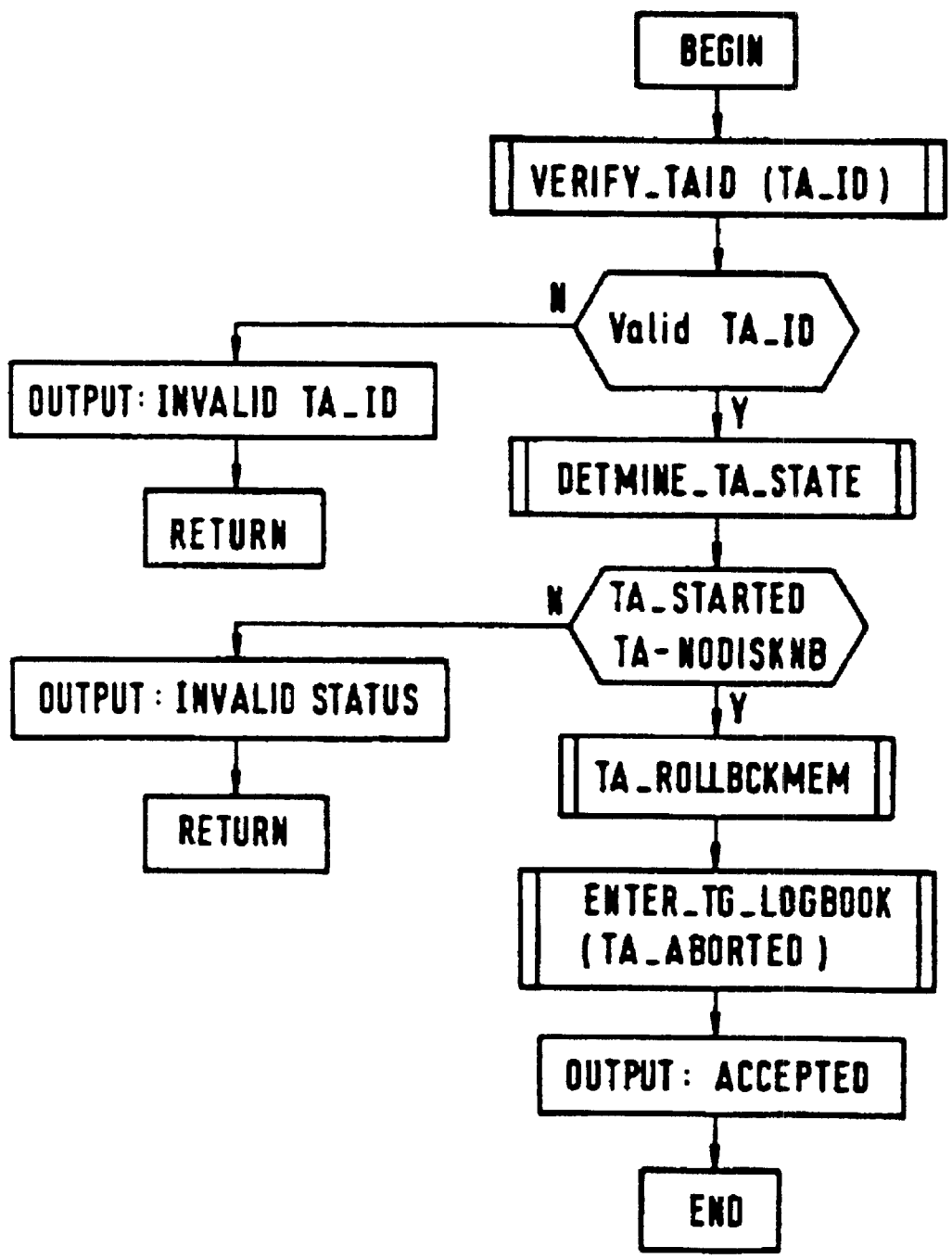
FIG. 14 shows the flowchart of a procedure that allows the user to break-off a transaction activated by him.
Figure 15A:
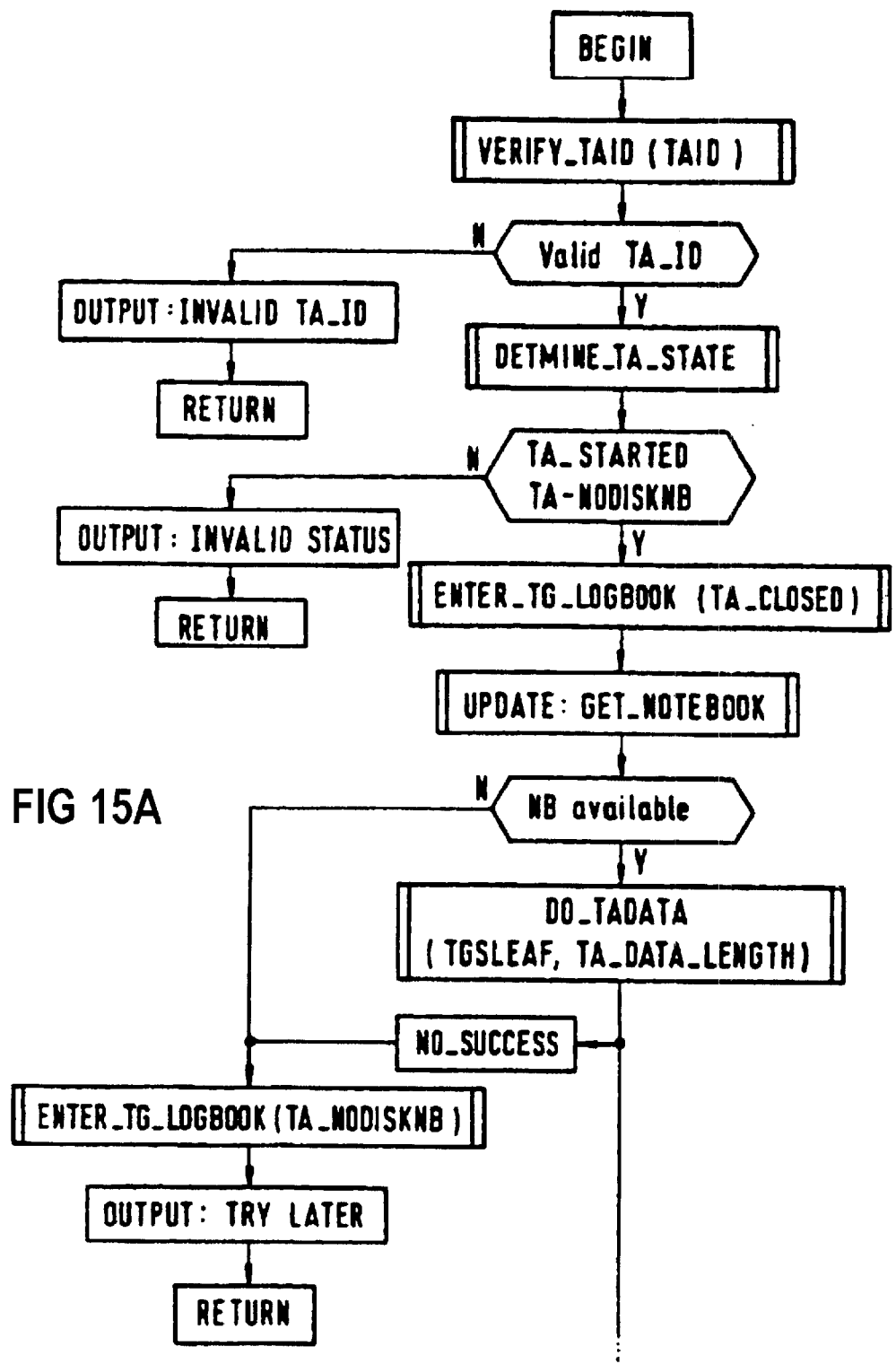
FIG. 15 shows the flowchart of a proceudre that ends the preparation phase and opens the activation phase of a transaction.
Figure 15B:
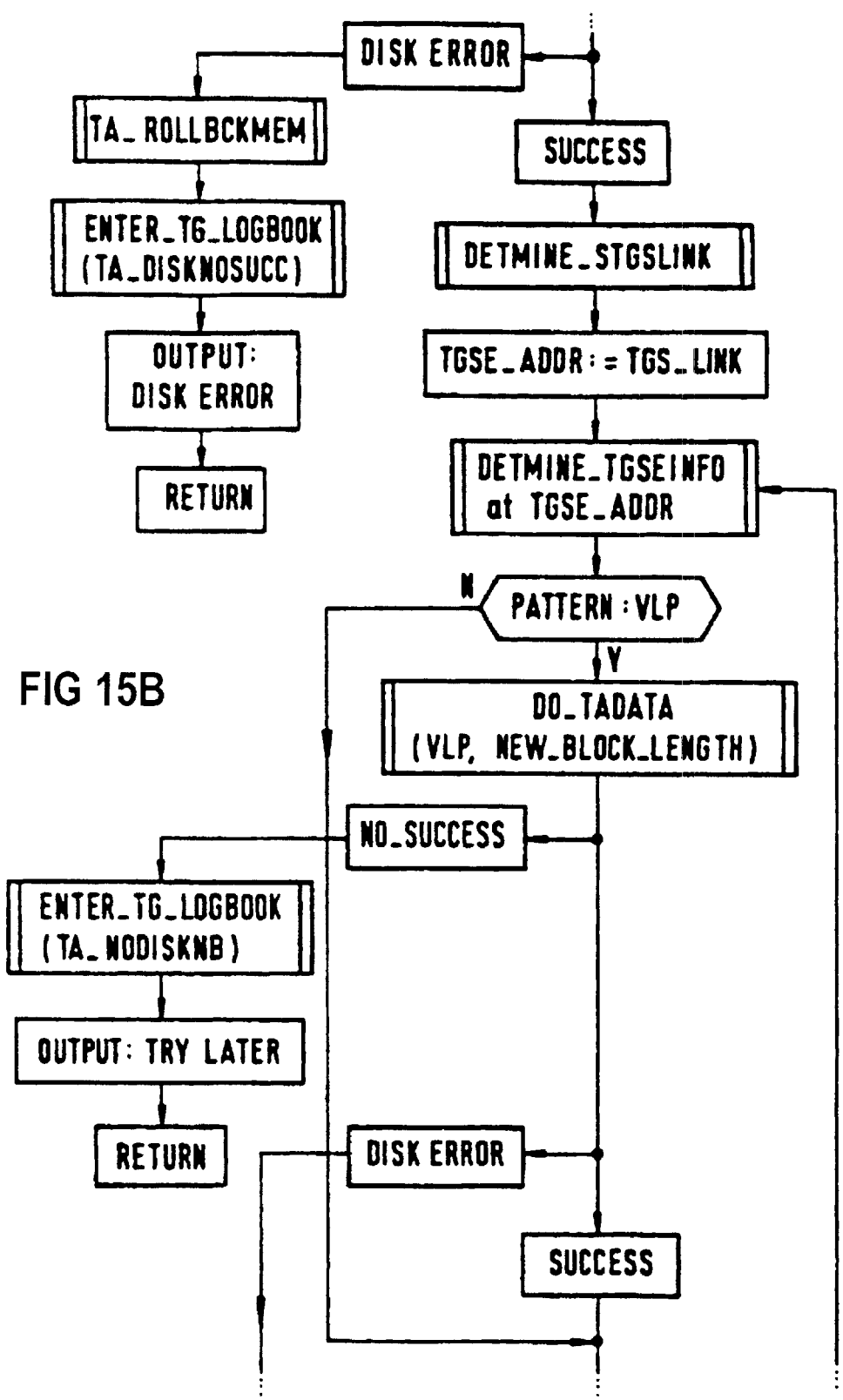
Figure 15C:
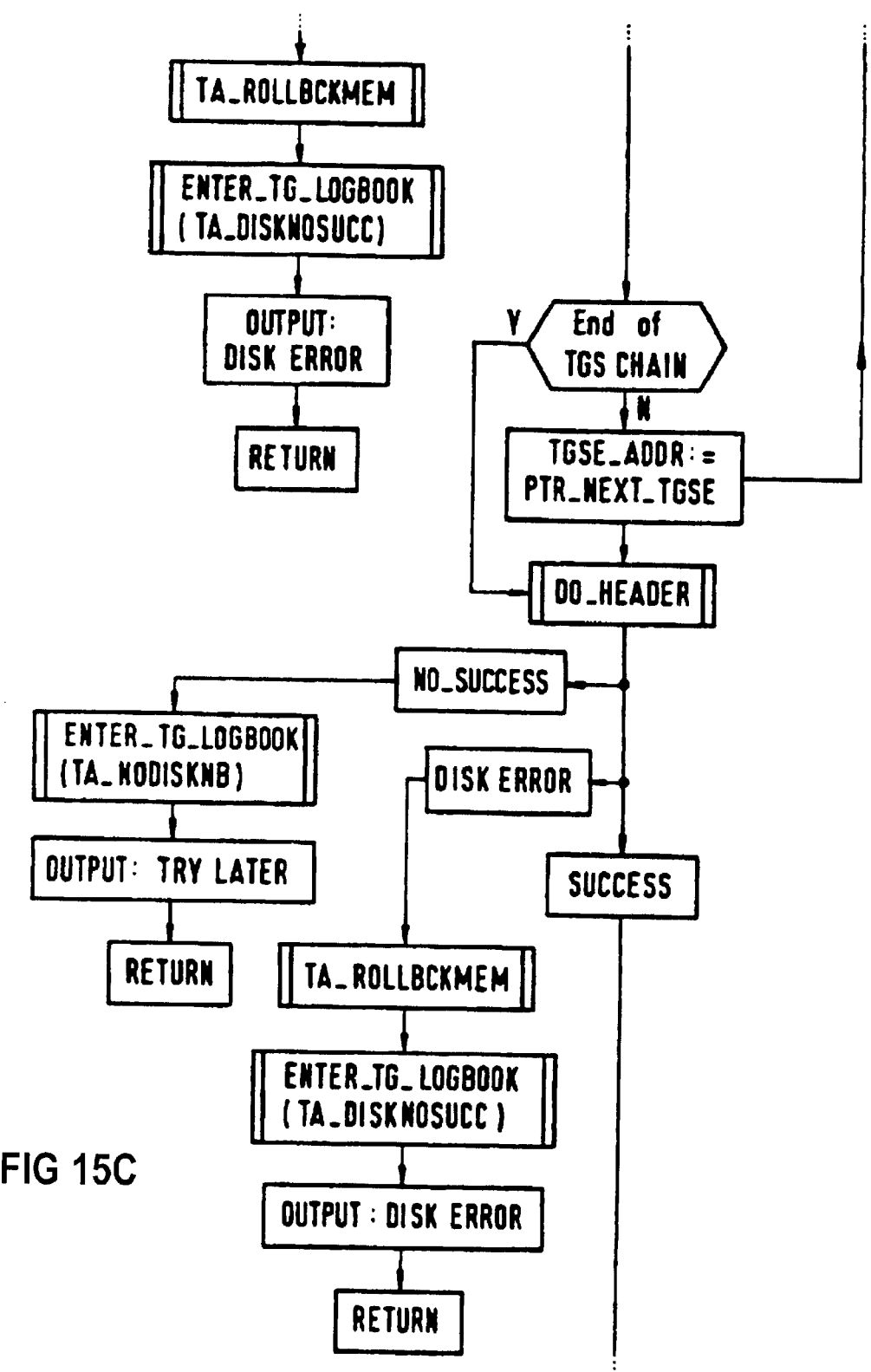
Figure 15D:
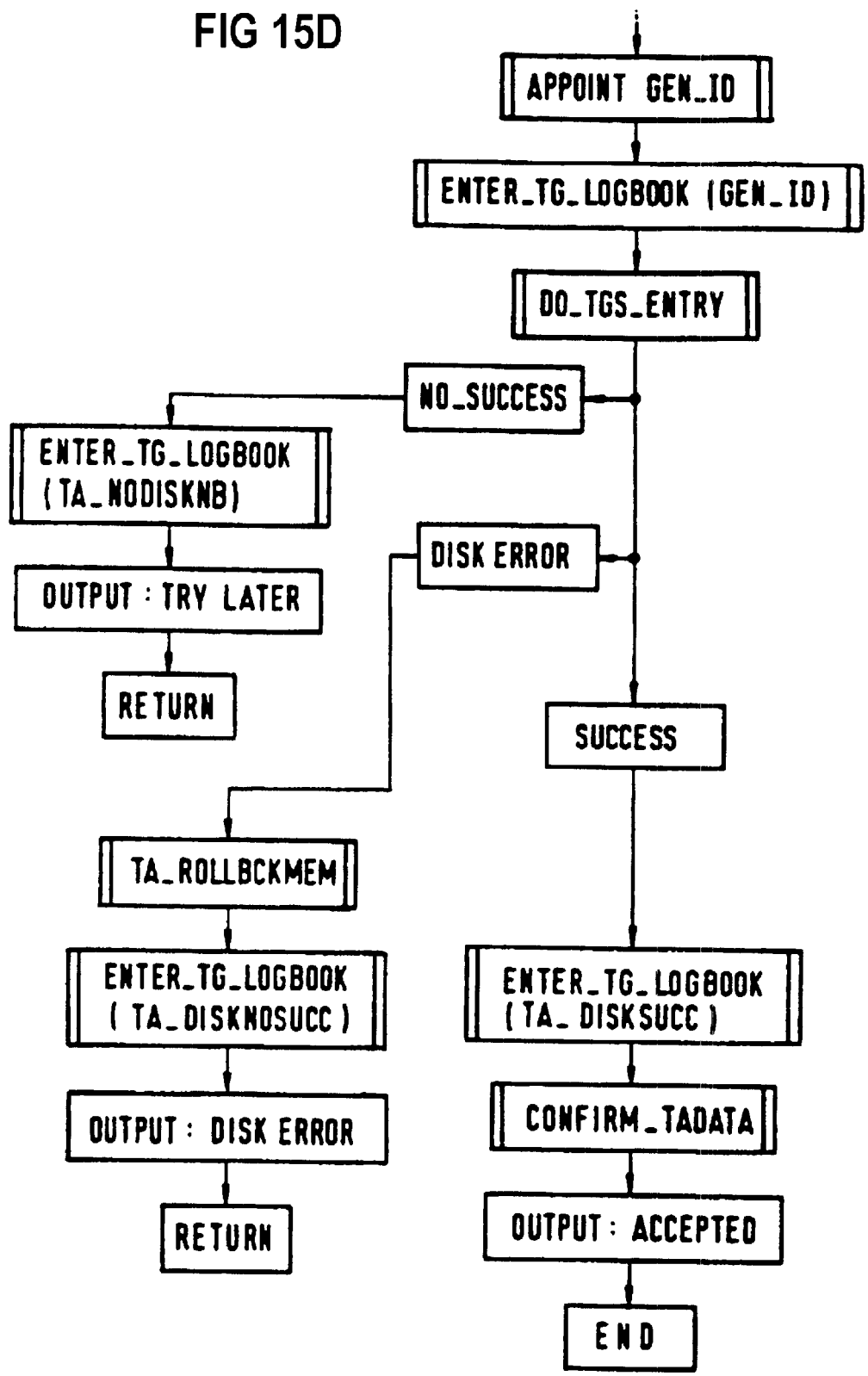

FIG. 14 shows the flow chart of a procedure ABORT_TA. This procedure allows the user to break off again a transaction activated by him. As the input parameter, the user in this case transfers to the access control system the transaction identifier belonging to the transaction, whereupon the associated transaction is reversed by the procedure. The output parameters of the procedure can in turn be taken from FIG. 14. The status information "TA_STARTED" or "TA_NODISKNB" possibly present at the beginning of the procedure is changed by the procedure into the status information "TA_ABORTED".

FIG. 15 shows the flow chart of a procedure DO_TA. This procedure ends the preparation phase and opens the activation phase of a transaction. The input parameter of this procedure is the transaction identifier TA_ID, while the output parameters of this procedure can in turn be taken from FIG. 15. This status of a transaction is changed twice by this procedure. The first time, the present status information "TA_STARTED" is changed into the status information "TA_CLOSED". The second time, the present status information "TA_CLOSED" is changed to the status information "TA_DISKSUCC", "TA_DISKNOSUCC" or "TA_NODISKNB".

The generations management system is explained in more detail below.

As already mentioned, the generations management system controls the reading-oriented access to the data objects of the data management system. The reading-oriented access in this case comprises a sequence of logically interconnected reading requirements. Within such a sequence it is ensured that access is made to a consistent set of data objects, i.e. a set of data objects which is valid with respect to a specific point in time, to be precise even when a transaction is updating in parallel with this one or more of the accessed data objects. To ensure this simultaneity, the new image and old image of each data object are stored in a parallel way both in the main memory and on the disk. The generation identifier GEN_ID, which is assigned to a transaction during the activation phase, is used by the generations management system in the generation phase of a transaction in order to identify in a unique way the new data generation produced by the transaction.

If more than one updating has been carried out for a particular data object and more than one old data generation was kept in the memory thereby, a so-called generation tree begins to grow.

Figure 16:
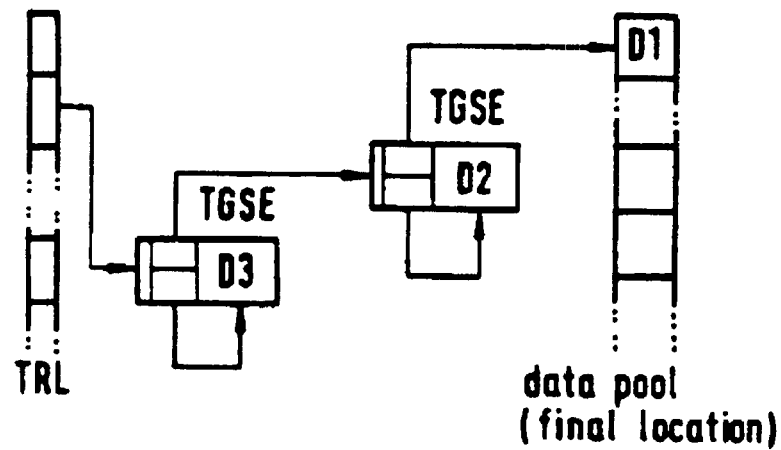
FIG. 16 shows a generation tree for a particular data object.

FIG. 16 shows an exemplary generation tree for a particular data object. The generation tree comprises three generations D1, D2 and D3. The youngest generation D3 is contained in a separating filter structure, while the oldest generation D1 is at its final location in the main memory. The data access path to the generation tree is realized by means of a translator structure in the form of a list, which is referred to in the following as translator list TRL. The record fields of the translator structure are activated by the access control system via a logical index and receive a physical pointer to a separating filter structure or, if no generation tree exists, back to the data object in the main memory. The record fields of the translator structure are hereafter referred to in keeping with their function as data link fields.

For disassembling the generation tree, the generations management system TMS (see FIG. 4) comprises a transaction post-processing system, which transfers all the data stored in the course of a transaction in the semi-permanent separating filter pool TGS_P (input data) out of the latter to its final storage locations in the main memory and on the disk. The start of the transaction post-processing system therefore marks the beginning of the generation phase for the transaction belonging to this data. However, at the same time, the data of the oldest data generation lying under this newly introduced data are at the same time finally destroyed by the transaction post-processing system. The start of the transaction post-processing system therefore marks the end of the generation phase for the transaction belonging to this data.

The transaction post-processing system is technically realized as an internal transaction of the access control system and is therefore synchronized and coordinated with respect to other transactions.

The transaction post-processing system is started for two different reasons and therefore has two different process priorities. If the transaction post-processing system is started in order to rectify a lack of resources in the TGS pool, it has a higher process priority than a management process. If the transaction post-processing system is started in order to transfer the data newly introduced by a transaction to its final storage locations, it has the same process priority as a management process.

Figure 17A:
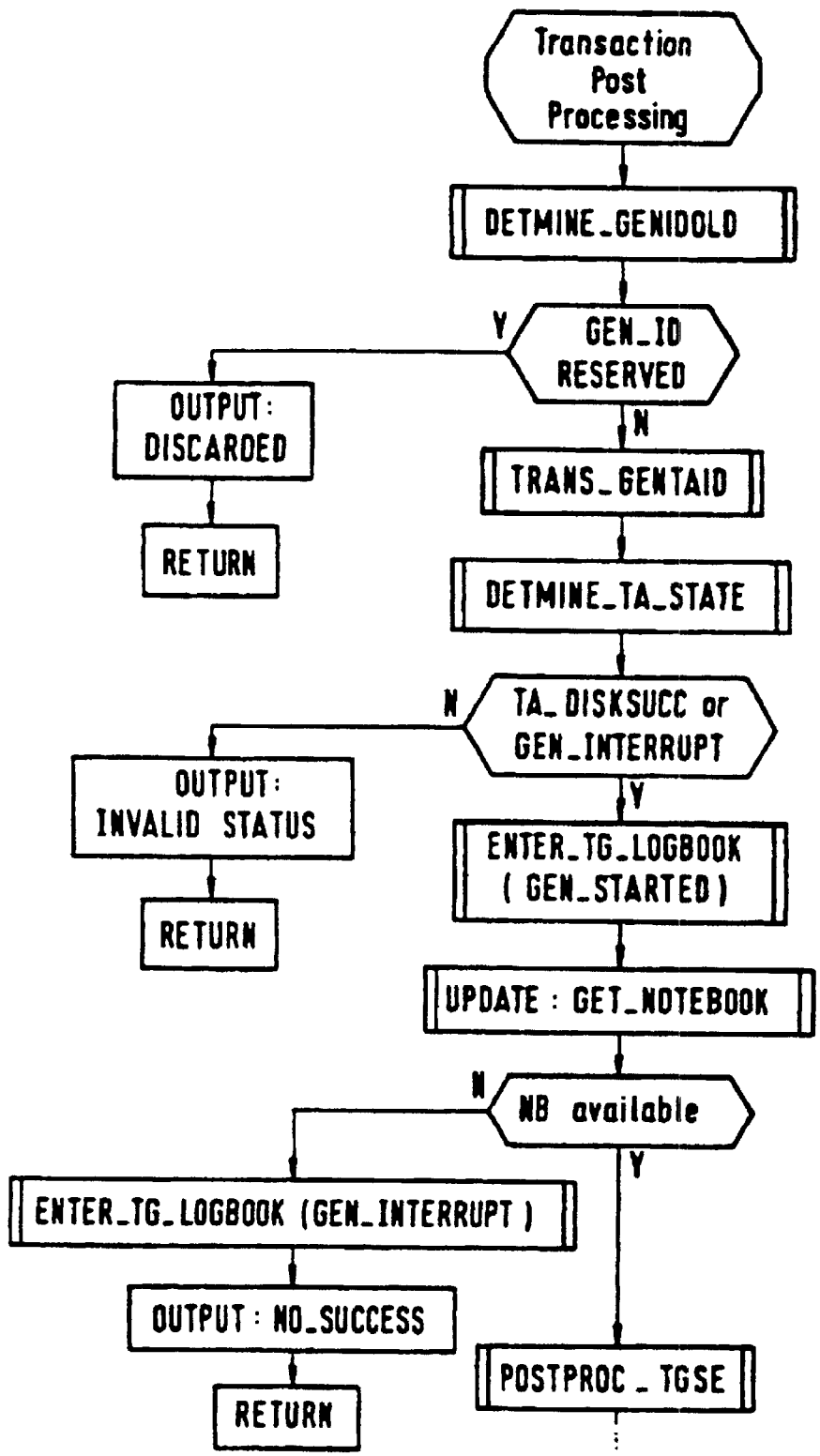
FIG. 17 shows the flowchart of the transaction post-processing system.
Figure 17B:
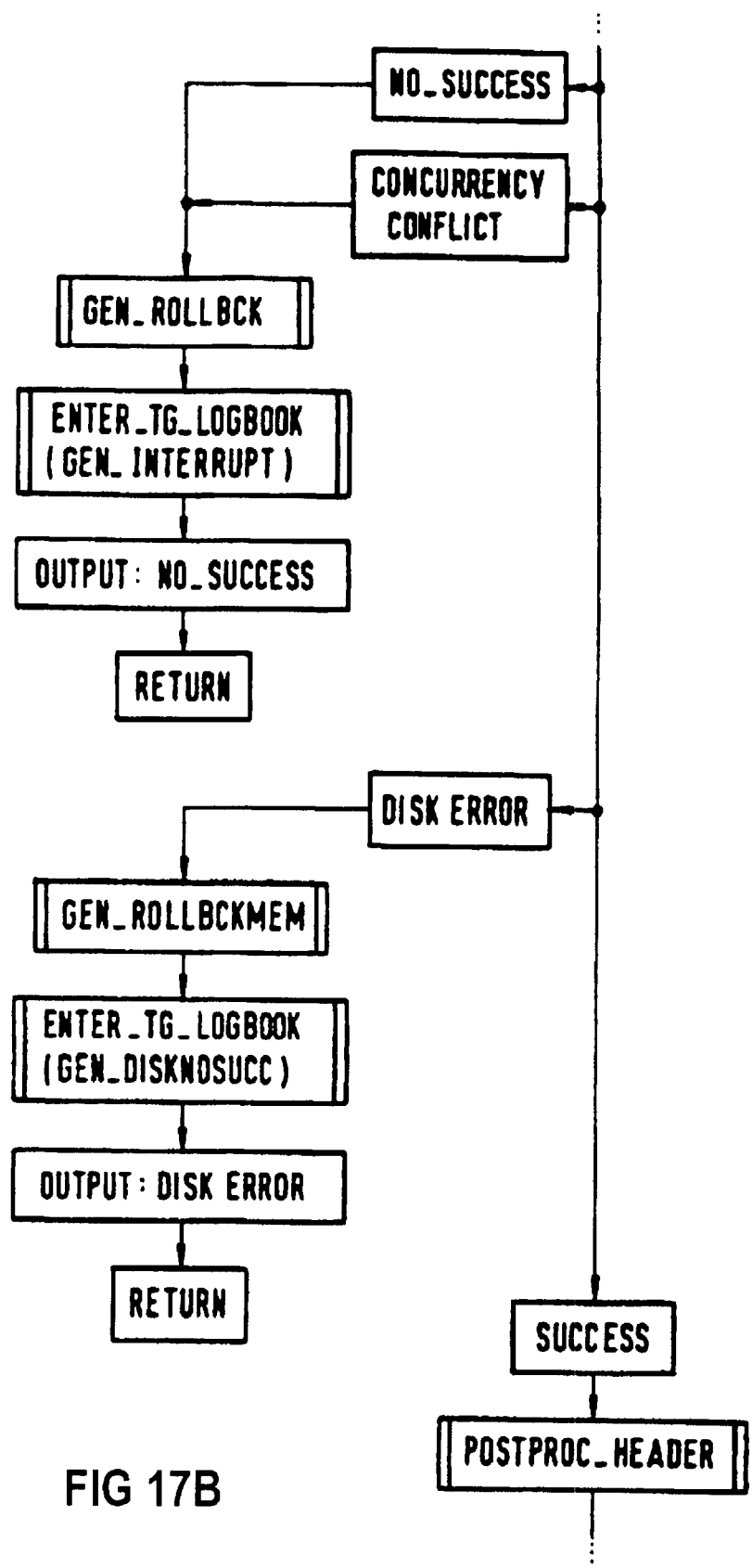
Figure 17C:
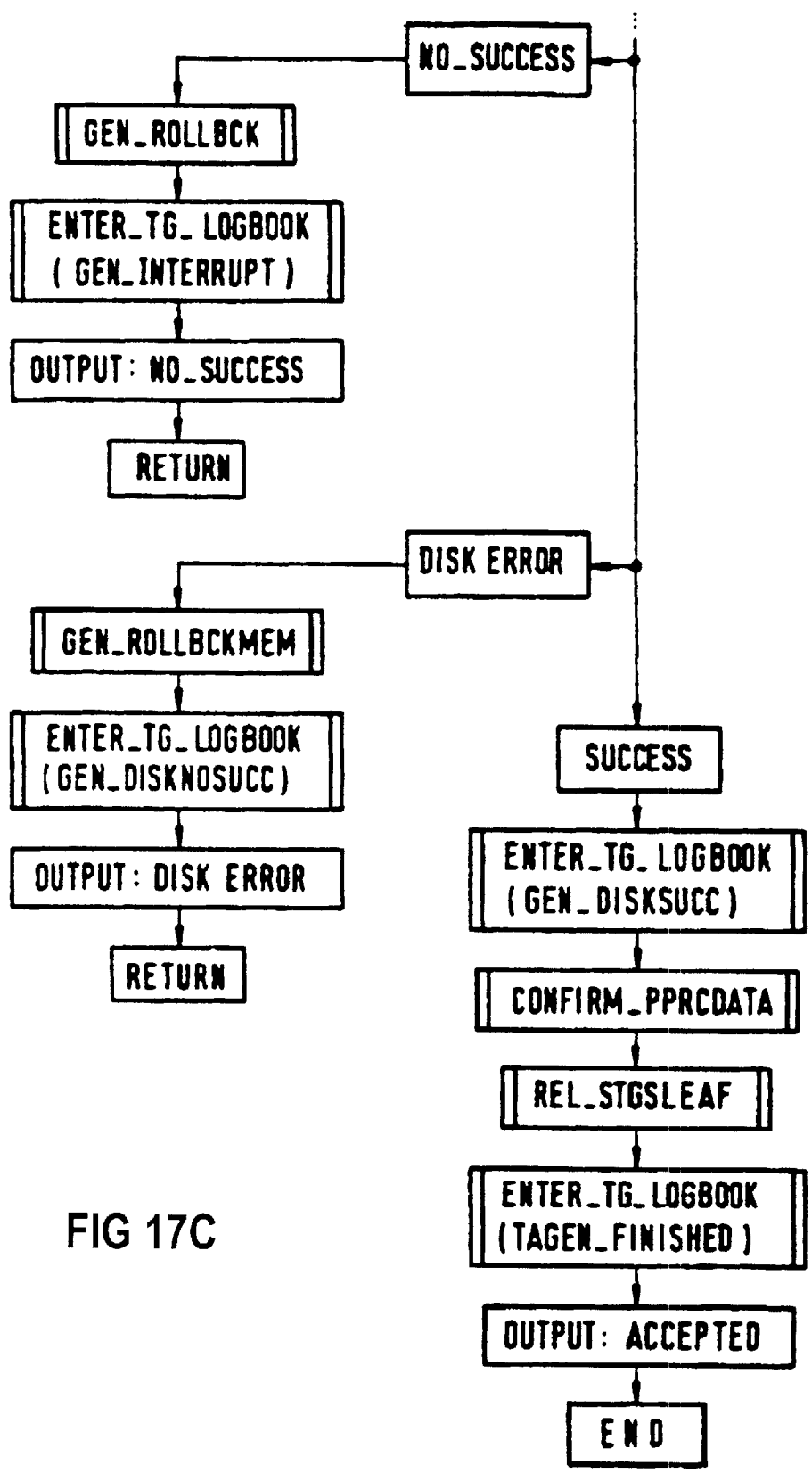

FIG. 17 shows the flow chart of the transaction post-processing system, designations occurring therein being explained in more detail further below.

Those access data structures of the resource management system RMS which serve exclusively for supporting the tasks of the generations management system are explained in more detail below.

Figure 18:
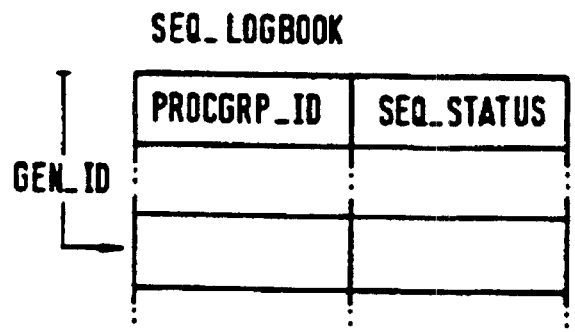
FIG. 18 shows the access data structure introduced in connection with the generations management system.

FIG. 18 shows the access data structure introduced in connection with the generations management system, the so-called reading logbook SEQ_LOGBOOK, in which active reading sequences are recorded. With the aid of the reading logbook, it is ensured that a data object which is reached by an active reading sequence will not be physically erased by the transaction post-processing system. The reading logbook also takes part in the timer supervision of reading sequences, since reading sequences which run for too long constitute a negative influence on the system. This participation consists in that the timer supervision cyclically scans the entries in the reading logbook. If it thereby discovers a reading sequence which has exceeded a certain time limit, this reading sequence is rejected.

The reading logbook contains a data field PROCGRP_ID, which contains information on the process group which the reading sequence has called up. Like the corresponding field in the transaction logbook, this field serves to support the recovery post-processing.

The reading logbook further comprises a data field SEQ_STATUS, which indicates to the transaction post-processing system a running active reading sequence and thereby excludes the possibility of a data object belonging to the generation identifier being physically erased.

Those resource primitives of the resources management system which are used exclusively by the generations management system and, like the resource primitives of the transaction management system, likewise form a shell around the access data structures of the resources management system are explained in more detail below.

A procedure VERIFY_GENID verifies the generation identifier GEN_ID and transmits it to the generations management system, which stores it in the scope table SCOPE_TAB.

A procedure ALLOC_SEQREC assigns to a reading sequence at the beginning a record in the reading logbook corresponding to the generation identifier.

A procedure ENTER_SEQLOG transfers a status information item of the reading sequence into the reading logbook.

A procedure DETMINE_GENIDOLD evaluates the scope table and determines the oldest generation identifier GEN_ID_OLD.

A procedure TRANS_GENTAID determines on the basis of the scope table that transaction identifier which corresponds to the generation identifier transferred to this procedure.

A procedure POSTPROC_TGSE of the transaction post-processing system TAPP progresses through the separating filter structure chain of a transaction and thereby carries out the following activities:

in the case of a low-prioritized transaction post-processing, it carries out a collision check, in that it calls up a procedure GEN_CONCTRL of the collision management system, which is explained in more detail later with reference to FIG. 22, it copies the content of a separating filter structure to the final storage location in the main memory, releases the separating filter structure from the data access path in the case of a linked memory block of the data pool and informs the data pool of this, it transfers transaction data into the buffer memory of the transaction and initiates, if necessary, an intermediate updating operation, it updates the header of the transaction leaf and enters the separating filter structure number NO_TGSE into the transaction logbook.

A procedure POSTPROC_HEADER of the transaction post-processing system, which comprises the following activities:

it changes the transient status information in the header of the separating filter pool to the value "TA_CLOSED", it clears the access field (barring field) to the header of the separating filter pool and to the transaction leaf of the transaction, it changes the status information in the transaction logbook to the value "GEN_DISKPREP" and enters the corresponding record in the header of the separating filter pool, it transfers the data in the corresponding record of the header of the separating filter pool and the data in the transaction logbook into a buffer memory NOTEBOOK (NB, it initiates and controls the updating operation on the disk DISK.

A procedure GEN_ROLLBCK allows a reversal (roll backward) of transactions in the generation phase and for this purpose carries out the following actions:

it progresses through the semi-permanent filter separating structure chain, it evaluates the linking data between the separating filter structure and the data access path, re-links, if necessary, the separating filter structure with the data access path, transfers the linking data to the buffer memory and, if necessary, initiates an intermediate updating operation onto the disk, it calls up the updating instance UPDATE to initiate the updating onto the disk, it uses the procedure CONFIRM_TADATA, which is likewise used by the transaction management system and has already been explained, earlier.

The interface procedures between the user and the generations management system is explained in more detail below with reference to FIGS. 19 and 20.

Figure 19:
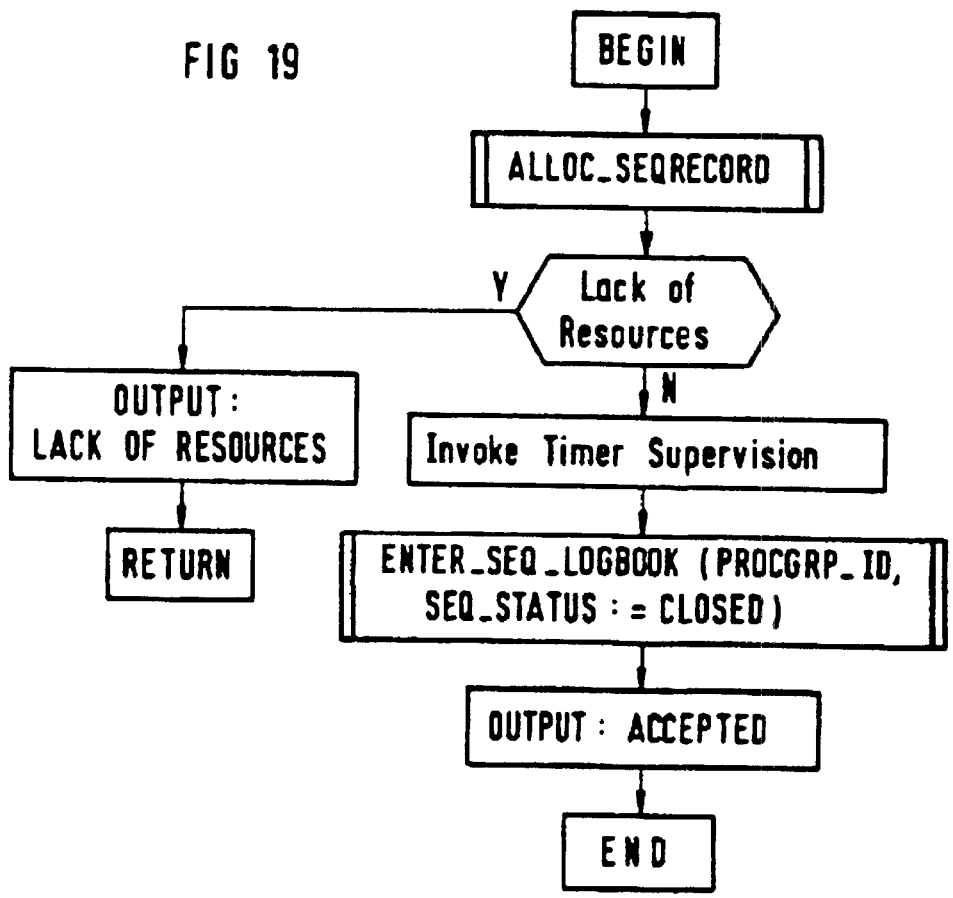
FIG. 19 shows the flowchart of a procedure that causes a reading sequence to be started.

FIG. 19 shows the flow chart of a procedure BEGIN_GETSEQUENCE, the calling up of which by the user causes a reading sequence to be started. This procedure assigns to the reading sequence a record field in the reading logbook corresponding to the momentarily current generation identifier and changes the parameter SEQ_STATUS to the value "closed". This ensures that no data object which belongs to the current generation identifier can be erased by the transaction post-processing. In addition, a timer supervision is called up by this procedure, in order to avoid a negative influence on the system by a long-running reading sequence. Serving as the input parameter of this procedure is the parameter PROCGRP_ID. Output parameters of this procedure are the generation identifier GEN_ID, and also a message parameter, which comprises the messages "lack of resources" and "accepted".

Figure 20:
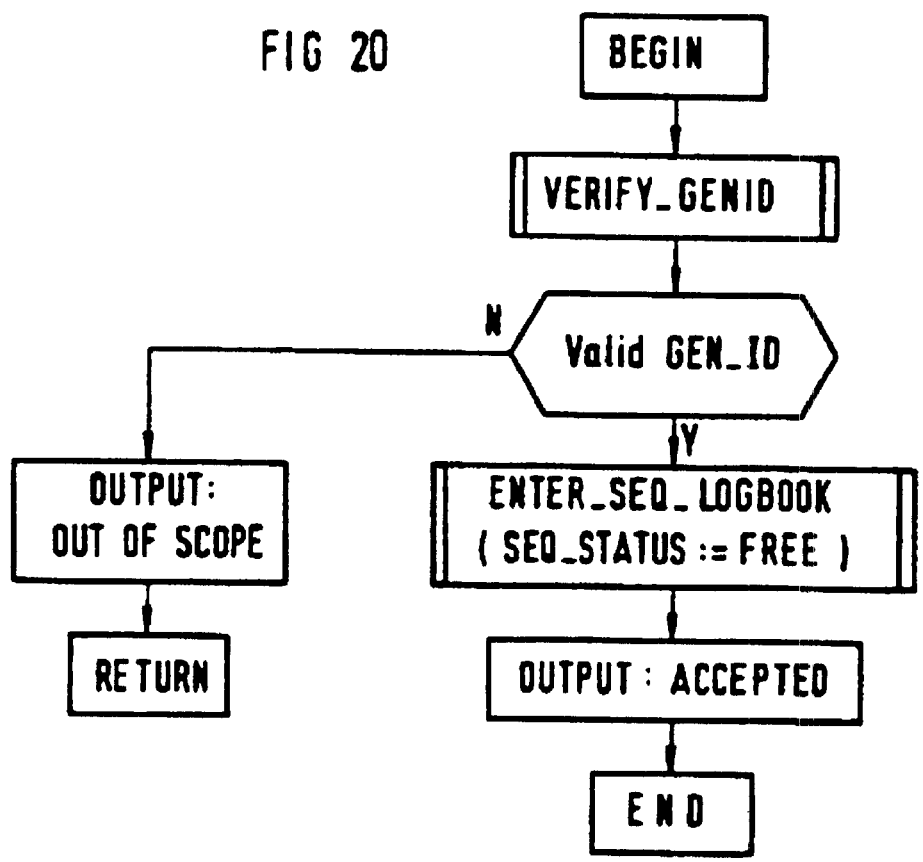
FIG. 20 shows a flowchart of the procedure that ends a reading sequence and that releases all data objects belonging to the generation identifier of the reading sequence.

FIG. 20 shows the flow chart of the procedure END_GETSEQUENCE, which ends a reading sequence and releases for transaction post-processing all the data objects belonging to the generation identifier of the reading sequence, in that it changes the parameter SEQ_STATUS to the value "FREE". The input parameter of this procedure is the parameter GEN_ID. The output parameter of this procedure is a message parameter with the messages "out of scope" or "accepted".

The collision management system, which handles access conflicts of simultaneously occuring transactions, which cannot be entirely avoided from the outset by planning measures, is explained in more detail below. The collision management system essentially comprises two procedures, namely a procedure TA_CONCTRL, which handles access collisions in the phase of a transaction under the control of the transaction management system, and a procedure GEN_CONCTRL, which handles access collisions in the phase of a transaction under the control of the generations management system.

Figure 21:
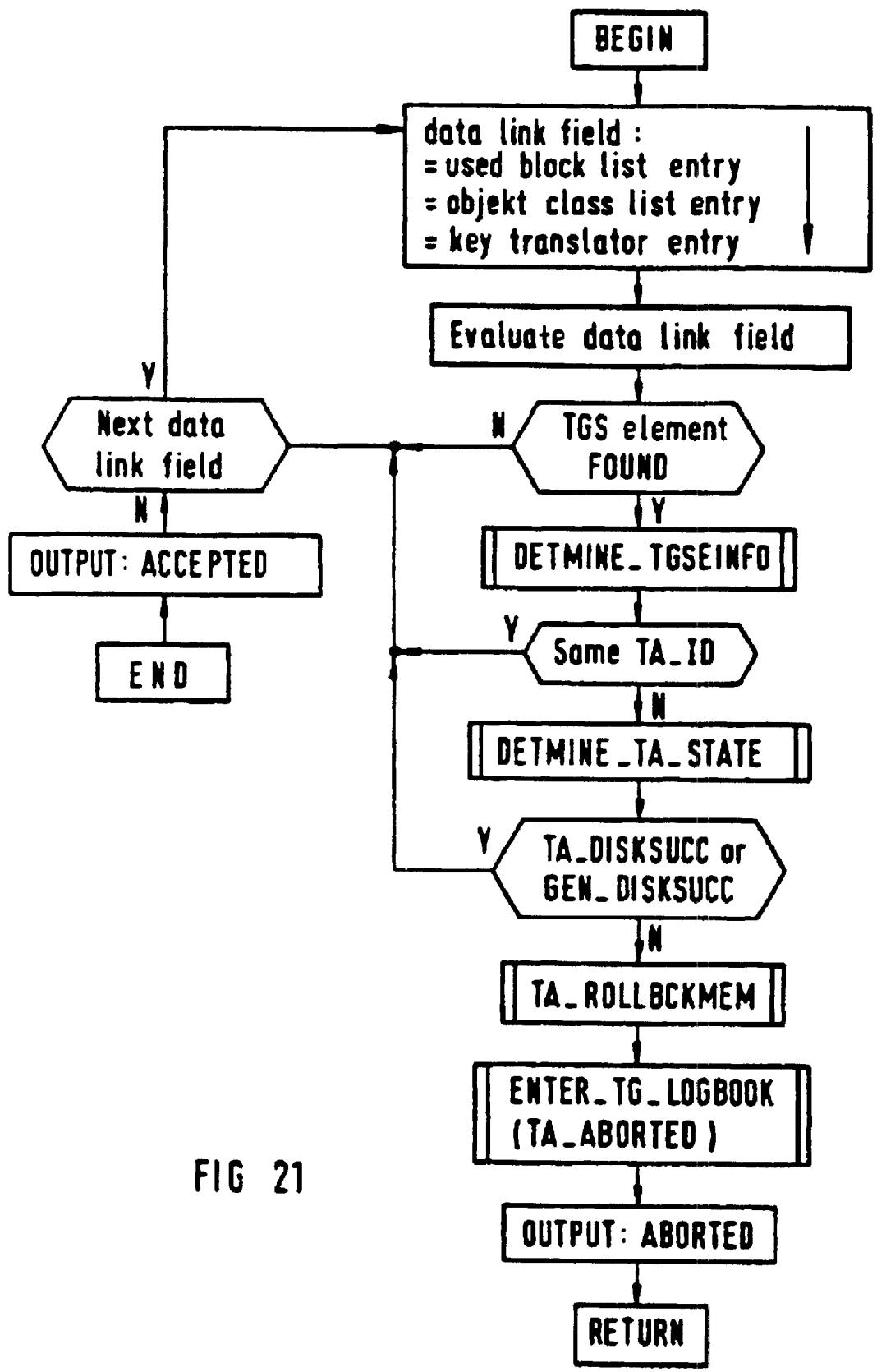
FIG. 21 shows a flowchart of the procedure that handles access conflicts in the preparation phase of a transaction.

FIG. 21 shows a flow chart of the procedure TA_CONCTRL, which is embedded in the procedure ALLOC_TGSE and handles access conflicts in the preparation phase of a transaction if two transactions want to link their separating filter structure with the same data link field of the data access path to a data object. To resolve this conflict situation, a data link field (data link field) contains not only the pointer field but also an access field, in which a transaction stores its transaction identifier if the access field is not yet closed, i.e. if no other transaction identifier is already stored in the access field. The linking of the separating filter structure to the data access path is then brought about by leaving the physical pointer pointing to the separating filter structure. A separating filter structure which is to be linked with a specific data link field in the course of a transaction gets into a collision conflict if another active transaction has already occupied the access field of this data link field. The coordination of this conflict is regulated as follows:

a transaction in the preparation phase which has reserved an access field to a data object first is then continued. The other transaction is rejected.

A transaction which has already reached the activation phase is no longer rejected on the basis of access conflicts.

Figure 22:
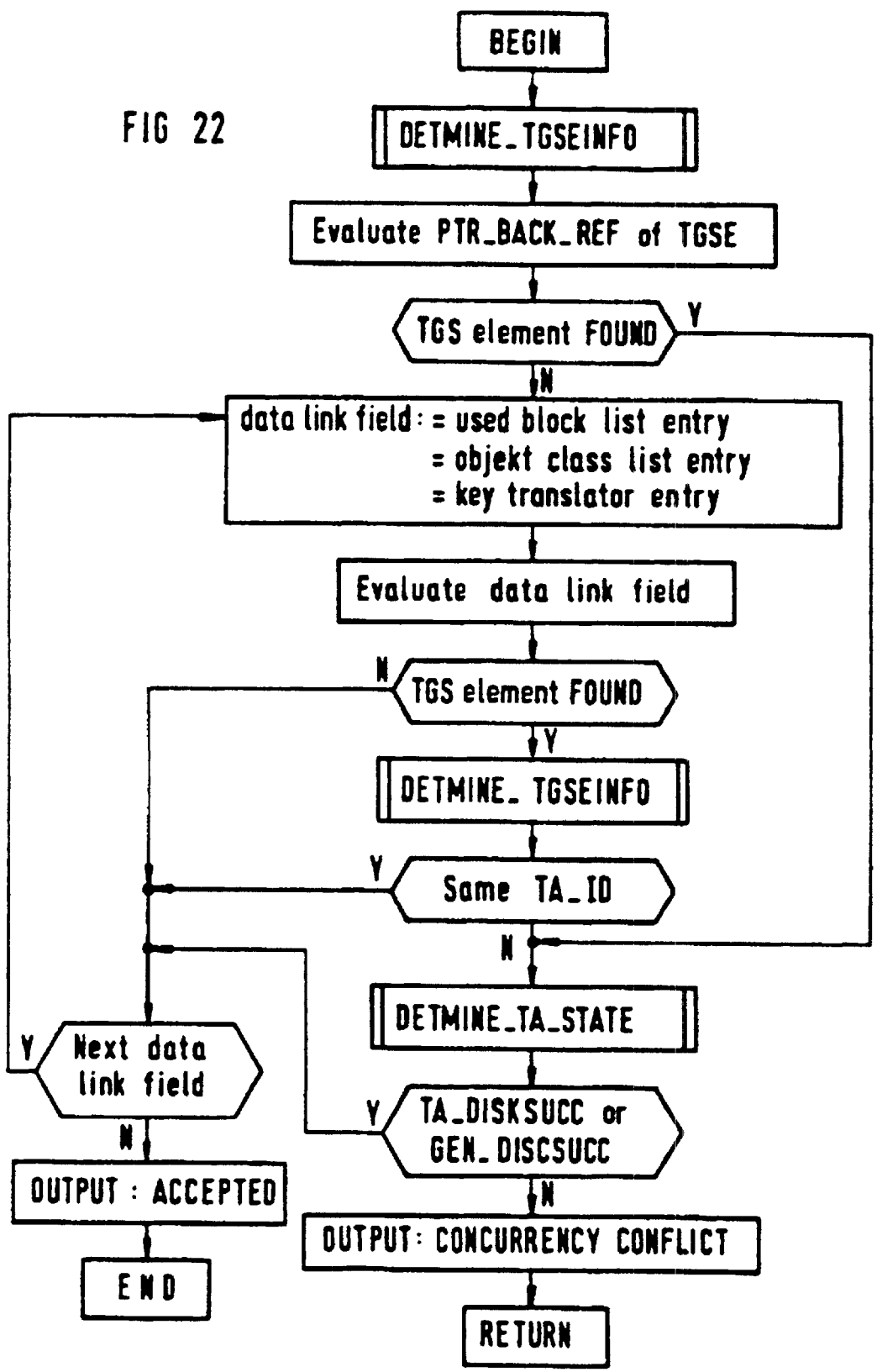
FIG. 22 shows a flowchart of the procedure that handles conflicts between the transaction post-processing system and a reading sequence in the generation phase of a transaction.

FIG. 22 shows a flow chart of the procedure GEN_CONCTRL, which is embedded in the procedure POSTPROCR_TGSE of the transaction post-processing system and handles conflicts between the transaction post-processing system and a reading sequence in the generation phase of a transaction. To be more precise, in the case of a low-prioritized transaction post-processing, the procedure GEN_CONCTRL prevents a data generation being erased if a reading sequence wants to access this data generation. In contrast with this, in the case of a high-prioritized transaction post-processing, which is carried out in the case of a lack of resources for the access control system, the reading sequence is rejected and the data generation is erased.

The individual actions combined in a transaction or a reading sequence, or to be more precise the procedures for carrying out these individual actions, are explained in more detail below with reference to FIGS. 23, 24 and 25.

Figure 23:
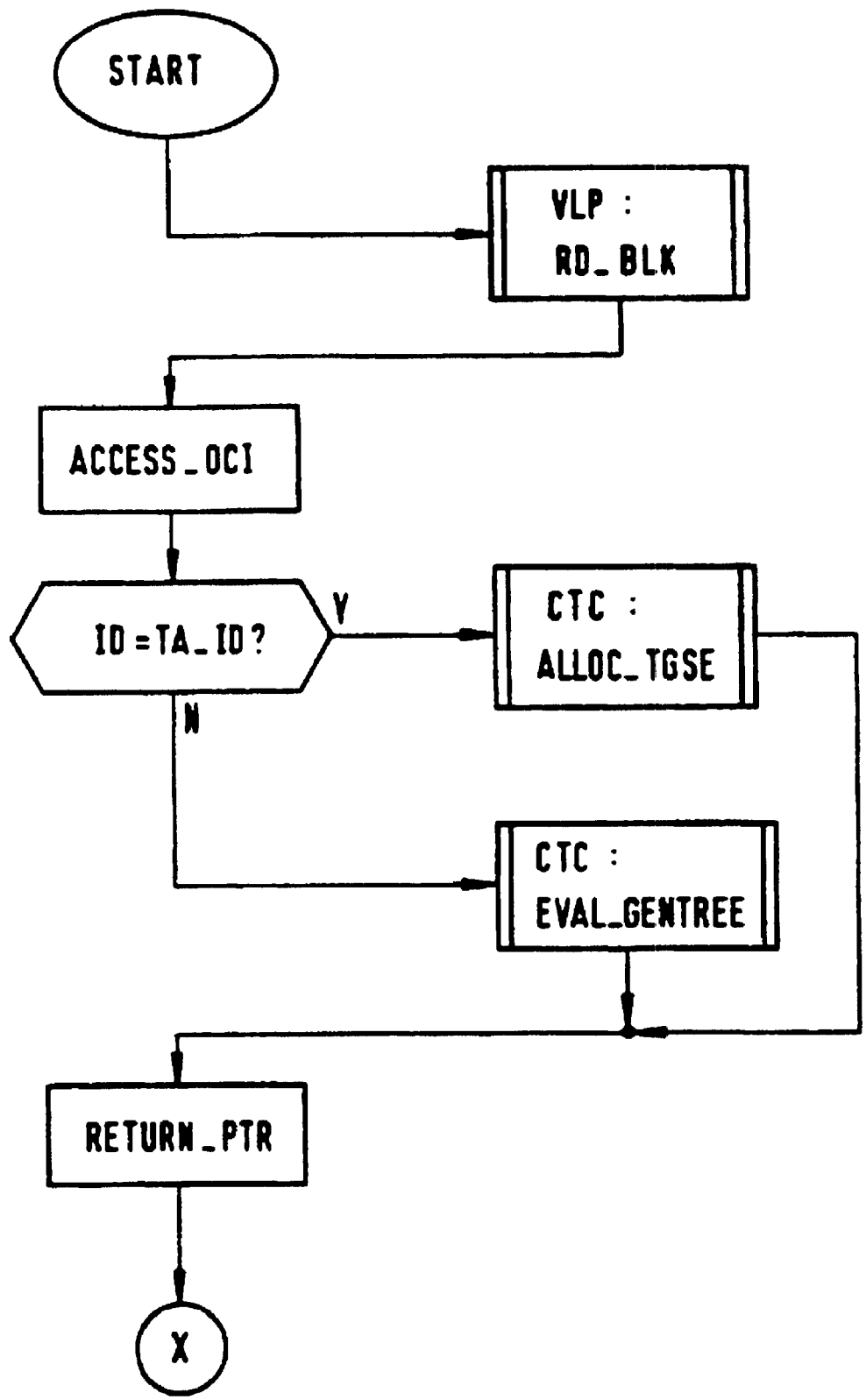
FIG. 23 shows a procedure that carries out an individual reading action.

FIG. 23 shows a procedure GET, which is contained in a user module and carries out an individual reading action, it being possible for it to be called up both in the course of a transaction and in the course of a reading sequence. Input parameters of the procedure GET are an identifier of the reading action and a logical key, which leads through the data access path to the data object. The identifier of the transaction is a transaction identifier TA_ID if the procedure GET is used within a transaction. In the other case, namely if the procedure GET is used within a reading sequence, the identifier is a generation identifier GEN_ID. Output parameters of the procedure GET are the data object and a message parameter for the return of check messages.

First of all, lists of the data access path are run through on the basis of the logical key.

Figure 24:
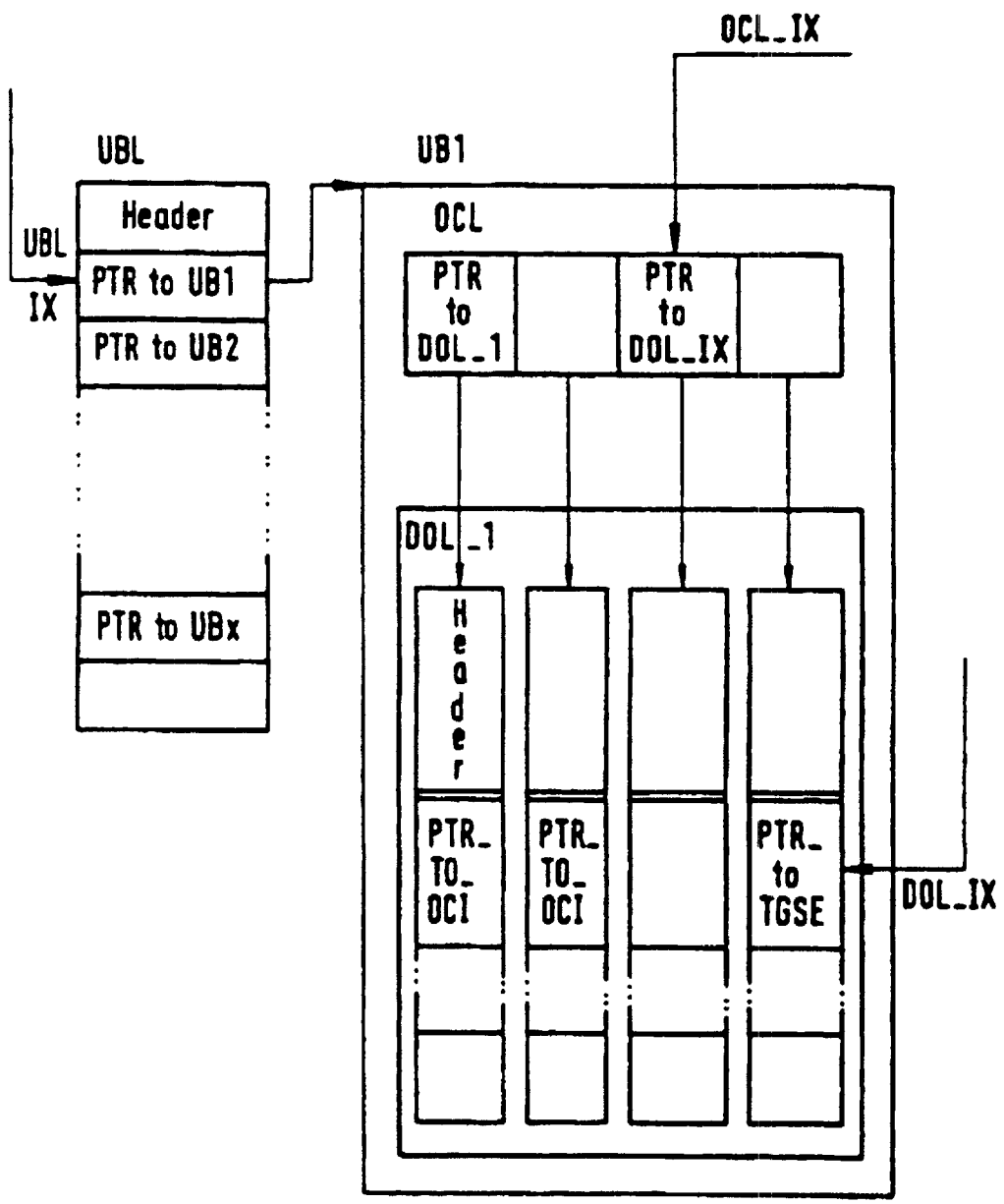
FIG. 24 shows the structure of a data access path.
Figure 25:
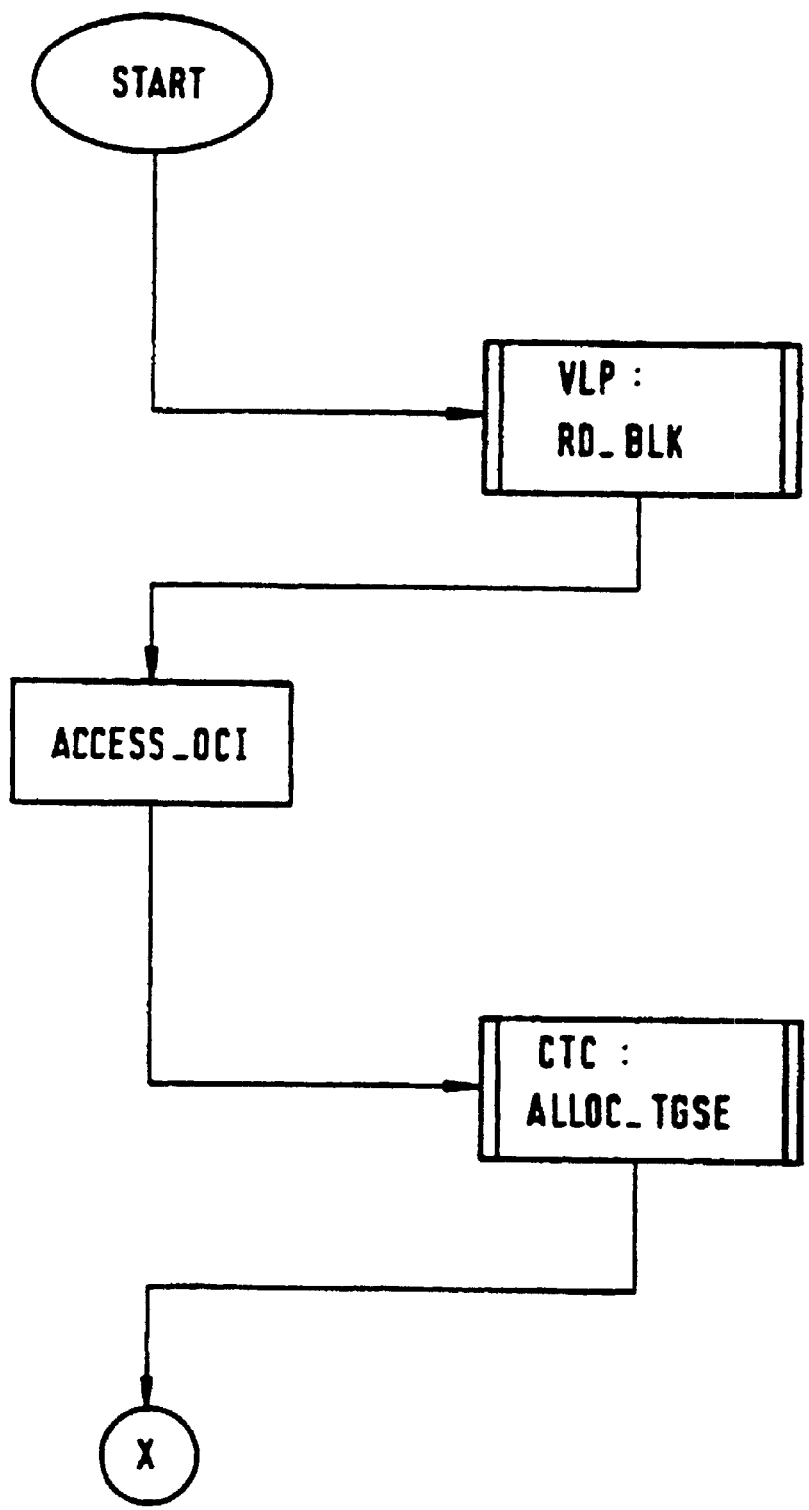
FIG. 25 shows a procedure for data access.

FIG. 24 shows the exemplary structure of a data access path, which comprises a plurality of lists and is stored in the user-independent data module VLP. The data access path comprises a data block list UBL, the list elements of which represent pointers to data blocks UB, as well as, within a data block UB, an object class list OCL and data object lists DOL. The logical key comprises indexes of said lists, namely the indexes UBL_IX, OCL_IX and DOL_IX, on the basis of which finally the pointer to a data object OCI or a separation filter structure TGSE can be determined.

First of all the procedure GET runs through the data access path, in that it calls up the procedure RD_BLK, which is implemented in the user-independent central data pool VLP. This procedure supplies as the return value the physical pointer to a data object list DOL. In the case of a transaction, this pointer is not used until the activation phase, following the preparation phase of the transaction, in order to execute the actual access.

Next, the procedure ACCESS_OCI with the parameters "pointer to the data object list DOL" and "DOL_IX" is called up. This procedure investigates, inter alia, the header of the DOL and determines whether it is a valid index in the case of the transferred parameter "DOL_IX".

If the index DOL_IX is valid, subsequently the list field of the list DOL corresponding to the index DOL_IX is analyzed. It is thereby investigated whether the identifier ID stored in the access field (barring field) of the list field is a transaction identifier or a generation identifier. This is represented in FIG. 23 by a branch block.

If it is a generation identifier, the generation tree adjoining the data access path is evaluated on the basis of the procedure EVAL_GENTREE and the physical pointer corresponding to the generation identifier is then returned to the data object.

If the identifier ID is a transaction identifier, the procedure ALLOC_TGSE is called up, which prepares a subsequent writing action by a procedure SET, and the data object is barred with respect to other transactions. This also has the consequence that, during the activation phase of the transaction, the transaction post-processing cannot carry out any actions with respect to this data object.

A user-specific data module GMI comprises furthermore a procedure SET, which modifies a data object within a transaction. Input parameters of this procedure are a transaction identifier TA_ID, a logical key for leading through the data access path and a pointer to the data to be newly taken over as well as an indication of the length of the new data. The output parameter is a parameter for acknowledgements.

Like the procedure GET, the procedure SET (see FIG. 25) comprises data access, which is carried out with the aid of the procedures RD_BLK and ACCESS_OCI. Thereafter, the procedure ALLOC_TGSE contained in the CTCC is called up, it requests a new separating filter structure TGSE and copies the new data or the new data object into the separating filter structure. If the procedure SET was prepared by the procedure GET, said assignment of a new separating filter structure does not take place.

The user-specific data modules comprise furthermore a procedure CREATE, which extends an object class by a data object, and a procedure DELETE, which reduces an object class by a data object. The two said procedures are of no significance for the description of the invention and are therefore not explained in any more detail.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A data management system of a real-time system, comprising:
   a) a transaction management system, which controls transactions between users and the data management system, a transaction being a sequence of accesses to logically interdependent data;
   b) an access data structure, which during a single transaction is inserted by the transaction management system into an access path of a data object to be modified, the access data structure inserted during said single transaction having a separating filter with both a first output to an old image of the data object and a second output to a new image of the data object; and
   c) a generations management system, which manages generation of new data which is produced during a transaction, after an ending of the transaction based on the access data structures inserted by the transaction management system.

2. The data management system of a real-time system as claimed in claim 1, wherein the data management system further comprises a management data structure, with which the transaction management system combines the access data structures inserted during a transaction by linking them together to form a data generation with a specific generation identifier, the generation identifier subsequently being transferred to the generations management system for management of the data generation combined in this way.

3. The data management system of a real-time system as claimed in claim 1, wherein the generations management system comprises a reading management system, which controls logically associated read accesses, the reading management system using the generation identifier transferred to the generations management system for carrying out a consistent reading sequence access.

4. The data management system of a real-time system as claimed in claim 1, wherein the access data structure comprises a barring field, with which a transaction can reserve exclusively for itself access to a data object appended to said access data structure by storing a transaction identifier.

5. The data management system of a real-time system as claimed in claim 1, wherein the access data structures are dynamically assigned to the data objects.

6. The data management system of a real-time system as claimed in claim 5, wherein the data layout of an access data structure is structured such that the first output of the separating filter of an access data structure can also point to an older access data structure.

7. The data management system of a real-time system as claimed in claim 3, wherein the logically associated accesses are reading sequences.

* * * * *